US012243457B2

(12) United States Patent
Kim et al.

(10) Patent No.: US 12,243,457 B2
(45) Date of Patent: Mar. 4, 2025

(54) APPARATUS AND METHOD FOR DEFECT INSPECTION OF DISPLAY PANEL

(71) Applicant: SAMSUNG DISPLAY CO., LTD., Yongin-si (KR)

(72) Inventors: Min-Hong Kim, Gyeonggi-do (KR); Taejoon Kim, Seongnam-si (KR); Jungmok Park, Hwaseong-si (KR); Bogeun Yuk, Hwaseong-si (KR); Hyun-Wook Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 240 days.

(21) Appl. No.: 18/150,931

(22) Filed: Jan. 6, 2023

(65) Prior Publication Data

US 2023/0316968 A1 Oct. 5, 2023

(30) Foreign Application Priority Data

Mar. 30, 2022 (KR) ........................ 10-2022-0039295

(51) Int. Cl.
*G01R 31/26* (2020.01)
*G09G 3/00* (2006.01)

(52) U.S. Cl.
CPC ......... *G09G 3/006* (2013.01); *G09G 2330/12* (2013.01)

(58) Field of Classification Search
CPC ........ G09G 3/006; G09G 3/20; G09G 3/3233; G09G 3/3607; G09G 2300/0426; G09G 2300/0439; G09G 2300/0814; G09G 2300/0819; G09G 2300/0871; G09G 2330/12; G09G 2320/0247; G02F 1/13629; G02F 1/136254
See application file for complete search history.

(56) References Cited

U.S. PATENT DOCUMENTS 9,213,456 B2 12/2015 Fujioka et al.
9,811,214 B2 11/2017 Forlines et al.
10,444,901 B2 10/2019 Shin
2004/0232940 A1* 11/2004 Chung .................. G09G 3/006 324/750.02
2013/0188104 A1* 7/2013 Aoki ................ G02F 1/134336 349/12
2016/0283029 A1* 9/2016 Hiratsuka ............... G06F 3/044
2019/0302558 A1* 10/2019 Hirata .................. G02F 1/1309

FOREIGN PATENT DOCUMENTS

KR 10-1192956 10/2012
KR 10-2018-0003738 1/2018
KR 10-1903419 10/2018
KR 10-2213486 2/2021

* cited by examiner

*Primary Examiner* — Thang X Le
(74) *Attorney, Agent, or Firm* — F. CHAU & ASSOCIATES, LLC

(57) ABSTRACT

Disclosed is an apparatus for inspecting a defect of a display panel. The apparatus for inspecting includes the display panel that displays an image, an input sensor that is disposed on the display panel and senses an input applied from outside, a sensor driving part that drives the input sensor, and an inspection part that is connected with the sensor driving part, sets a frequency of the input sensor to an inspection frequency, and detects the defect of the display panel based on a change in a jitter occurring when the input sensor is driven at the inspection frequency. The inspection frequency includes a harmonic frequency of a driving frequency of the display panel.

20 Claims, 14 Drawing Sheets

FIG. 11B

NOR NG

| Rx25 | Rx26 | Rx27 | Rx28 | Rx29 | Rx30 | Rx31 | Rx32 | Rx33 | Rx34 | Rx35 | |
|---|---|---|---|---|---|---|---|---|---|---|---|
| 54 | 20 | 26 | 22 | 23 | 21 | 21 | 62 | 133 | 4255 | 3879 | Tx0 |
| 97 | 57 | 33 | 35 | 36 | 41 | 40 | 98 | 234 | 7963 | 7240 | Tx1 |
| 102 | 71 | 36 | 30 | 32 | 38 | 38 | 113 | 263 | 8640 | 7861 | Tx2 |
| 44 | 41 | 37 | 14 | 12 | 18 | 18 | 57 | 127 | 4455 | 4055 | Tx3 |
| 26 | 17 | 17 | 16 | 19 | 20 | 22 | 50 | 119 | 3804 | 3484 | Tx4 |
| 59 | 36 | 33 | 35 | 36 | 39 | 40 | 109 | 252 | 8072 | 7325 | Tx5 |
| 51 | 31 | 30 | 32 | 35 | 41 | 40 | 115 | 274 | 8428 | 7692 | Tx6 |
| 40 | 19 | 14 | 15 | 18 | 18 | 21 | 47 | 106 | 3424 | 3126 | Tx7 |
| 26 | 18 | 17 | 15 | 16 | 21 | 20 | 48 | 115 | 3764 | 3439 | Tx8 |
| 58 | 36 | 34 | 35 | 37 | 44 | 42 | 111 | 251 | 8695 | 7955 | Tx9 |
| 58 | 38 | 33 | 32 | 37 | 41 | 42 | 116 | 273 | 8313 | 7598 | Tx10 |
| 25 | 17 | 15 | 19 | 22 | 20 | 19 | 45 | 105 | 3406 | 3117 | Tx11 |
| 27 | 17 | 19 | 16 | 19 | 20 | 20 | 48 | 106 | 3557 | 3252 | Tx12 |
| 59 | 37 | 34 | 37 | 38 | 40 | 41 | 119 | 279 | 8617 | 7859 | Tx13 |
| 60 | 39 | 34 | 36 | 39 | 42 | 42 | 117 | 259 | 8396 | 7666 | Tx14 |
| 27 | 16 | 17 | 16 | 17 | 20 | 23 | 47 | 106 | 3447 | 3152 | Tx15 |

APPARATUS AND METHOD FOR DEFECT INSPECTION OF DISPLAY PANEL

CROSS-REFERENCE TO RELATED APPLICATIONS

This application claims priority under 35 U.S.C. § 119 to Korean Patent Application No. 10-2022-0039295, filed on Mar. 30, 2022, in the Korean Intellectual Property Office, the disclosures of which are incorporated by reference herein in their entireties.

TECHNICAL FIELD

Embodiments of the present disclosure relate to an apparatus and a method for defect inspection of a display panel, and more particularly, relate to an apparatus and a method for inspecting a defect of a display panel, which affects an input sensor.

DISCUSSION OF RELATED ART

Various electronic devices, that are used in multi-media devices such as, for example, a television, a mobile phone, a tablet computer, a navigation system, and a game console, include a display device for displaying images. The display device includes a display panel as an output device and includes, for example, a keyboard, a mouse, or a remote controller as an input device. Also, the display device further includes an input sensor such as a touch panel, as an input device. The complex manufacturing processes used in producing the display panel may inevitably introduce defects to the display panel. These defects introduced to the display panel may affect the quality of the images displayed by the display panel and the performance of the input sensor disposed over the display panel. Thus, it is desirable to have an apparatus and/or a method capable of effectively detecting the defects of the display panel for defect inspection.

SUMMARY

Embodiments of the present disclosure provide an apparatus and a method for defect inspection of a display panel capable of effectively detecting a defect of the display panel, which reduces the performance of an input sensor.

Embodiments of the present disclosure provide an apparatus and a method for defect inspection of a display panel capable of effectively detecting a defect of the display panel by determining a specific inspection frequency allowing a magnitude of a jitter of an input sensor to increase and setting the determined inspection frequency upon driving the input sensor to inspect and detect the defect of the display panel.

According to an embodiment of the present disclosure, an apparatus for inspecting a defect of a display panel includes the display panel that displays an image, an input sensor that is disposed on the display panel and senses an input applied from outside, a sensor driving part that drives the input sensor, and an inspection part that is connected with the sensor driving part, sets a frequency of the input sensor to an inspection frequency, and detects the defect of the display panel based on a change in a jitter occurring when the input sensor is driven at the inspection frequency. The inspection frequency includes a harmonic frequency of a driving frequency of the display panel.

The display panel may include a base layer, a circuit element layer disposed on the base layer, a display element layer disposed on the circuit element layer, and an encapsulation layer disposed on the display element layer. The display element layer may include a first electrode, a second electrode disposed on the first electrode, and a light-emitting layer disposed between the first electrode and the second electrode.

The inspection part may detect a deposition defect of the second electrode.

The inspection part may include a frequency setting part that sets the frequency of the input sensor to the inspection frequency, and a defect detection part that determines the defect of the display panel when a level of the jitter is higher than a reference level.

The input sensor may include a plurality of sensing electrodes, and the plurality of sensing electrodes may include a plurality of transmit electrodes and a plurality of receive electrodes crossing each other.

The defect detection part may extract specific sensing electrodes, at which the level of the jitter is higher than the reference level, from among the plurality of sensing electrodes, and may determine specific portions of the display panel, which overlap the specific sensing electrodes thus extracted, as the defect.

The inspection part may further include a frequency selection part that selects a frequency, which allows a magnitude of the change in the jitter of the input sensor to increase, as the inspection frequency and stores the selected frequency in the sensor driving part.

The frequency selection part may select a value obtained by multiplying a number of scan lines of the display panel and a refresh rate of a screen together as the inspection frequency.

The frequency selection part may drive the input sensor at a plurality of frequencies of a given range, with the display panel driven, and may select frequencies, at which a change magnitude in the level of the jitter is equal to or greater than a specific reference, as the inspection frequency.

The frequency selection part may calculate the inspection frequency from the driving frequency of the display panel through fast Fourier transform, with the display panel driven and the input sensor not driven.

The inspection part may monitor the change in the jitter while increasing a number of frames to be driven in the input sensor.

According to an embodiment of the present disclosure, a method for inspecting a defect of a display panel includes driving the display panel, setting an inspection frequency of an input sensor disposed on the display panel, driving the input sensor at the inspection frequency, and inspecting the defect of the display panel based on a change in a jitter occurring when the input sensor is driven. The inspection frequency includes a harmonic frequency of a driving frequency of the display panel.

The inspecting of the defect of the display panel may include detecting a deposition defect of a power electrode disposed between a light-emitting layer and an encapsulation layer included in the display panel.

The inspecting of the defect of the display panel may include determining the defect of the display panel when a level of the jitter is higher than a reference level.

The input sensor may include a plurality of sensing electrodes, and the plurality of sensing electrodes may include a plurality of transmit electrodes and a plurality of receive electrodes crossing each other.

The determining of the defect may include extracting specific sensing electrodes, at which the level of the jitter is higher than the reference level, from among the plurality of sensing electrodes, and determining specific portions of the display panel, which overlap the specific sensing electrodes thus extracted, as the defect.

The method may further include selecting a frequency, which allows a magnitude of the change in the jitter of the input sensor to increase, as the inspection frequency, so as to be stored in a memory.

The selecting of the inspection frequency may include selecting a value obtained by multiplying a number of scan lines of the display panel and a refresh rate of a screen as the inspection frequency.

The selecting of the inspection frequency may include driving the input sensor at a plurality of frequencies of a given range, with the display panel driven, and selecting frequencies, at which a change magnitude of the level of the jitter is equal to or greater than a specific reference, from among the plurality of frequencies as the inspection frequency.

The inspecting of the defect of the display panel may include monitoring the change in the jitter while increasing a number of frames to be driven in the input sensor.

BRIEF DESCRIPTION OF THE DRAWINGS

The above and other aspects and features of the present disclosure will become apparent by describing in detail embodiments thereof with reference to the accompanying drawings, in which:

FIGS. 11A and 11B are a graph and a table illustrating a change in a jitter level according to an embodiment of the present disclosure.

Figure 1:
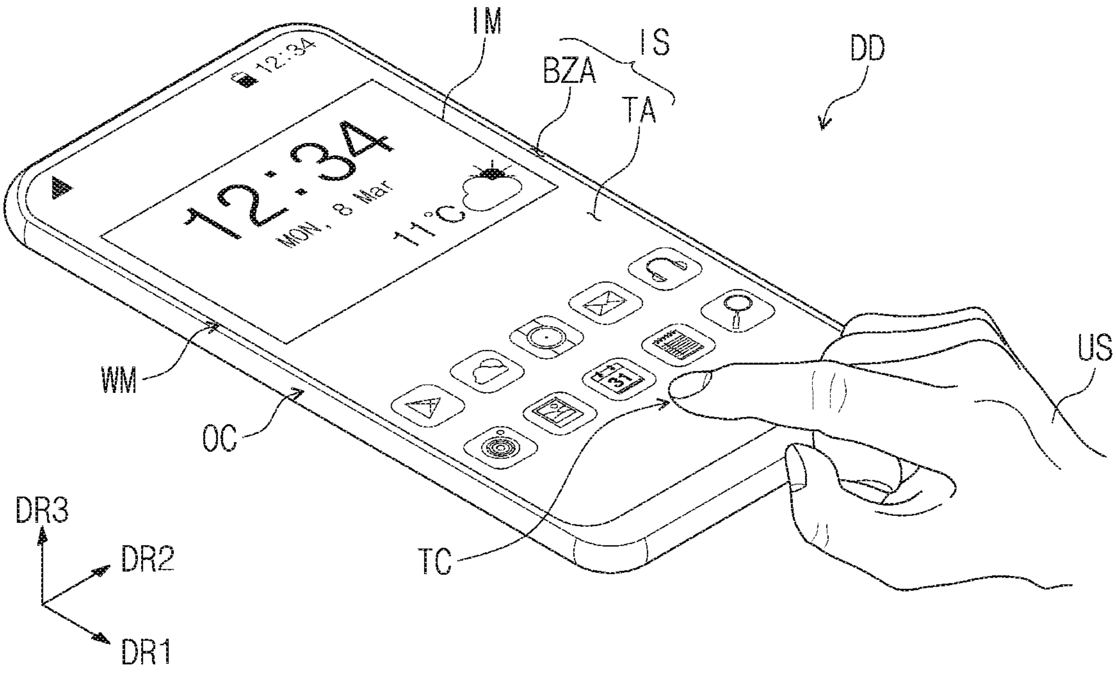
FIG. 1 is a perspective view illustrating a display device according to an embodiment of the present disclosure.

Since the drawings in FIGS. 1-12 are intended for illustrative purposes, the elements in the drawings are not necessarily drawn to scale. For example, some of the elements may be enlarged or exaggerated for clarity purpose.

DETAILED DESCRIPTION OF THE EMBODIMENTS

In the specification, the expression that a first component (or area, layer, part, portion, etc.) is “on”, “connected with”, or “coupled to” a second component means that the first component is directly on, directly connected with, or directly coupled to the second component or means that a third component is disposed therebetween.

Like reference numerals refer to like components. The expression “and/or” includes any and all combinations which associated components are capable of defining.

Although the terms “first”, “second”, etc. may be used to describe various components, the components should not be construed as being limited by the terms. The terms are only used to distinguish one component from another component. For example, without departing from the scope and spirit of the present disclosure, a first component may be referred to as a “second component”, and similarly, the second component may be referred to as the “first component”. The singular forms are intended to include the plural forms unless the context clearly indicates otherwise.

“About” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value.

The terms “under”, “below”, “on”, “above”, etc. are used to describe the correlation of components illustrated in drawings. The terms that are relative in concept are described based on a direction shown in drawings, and it will be understood that these spatially relative terms are intended to encompass different orientations of the device in use or operation, in addition to the orientation illustrated in the drawings.

It will be further understood that the terms “comprise”, “include”, “have”, etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in an ideal or overly formal sense unless explicitly defined in the present specification.

Below, embodiments of the present disclosure will be described with reference to accompanying drawings.

Figure 2:
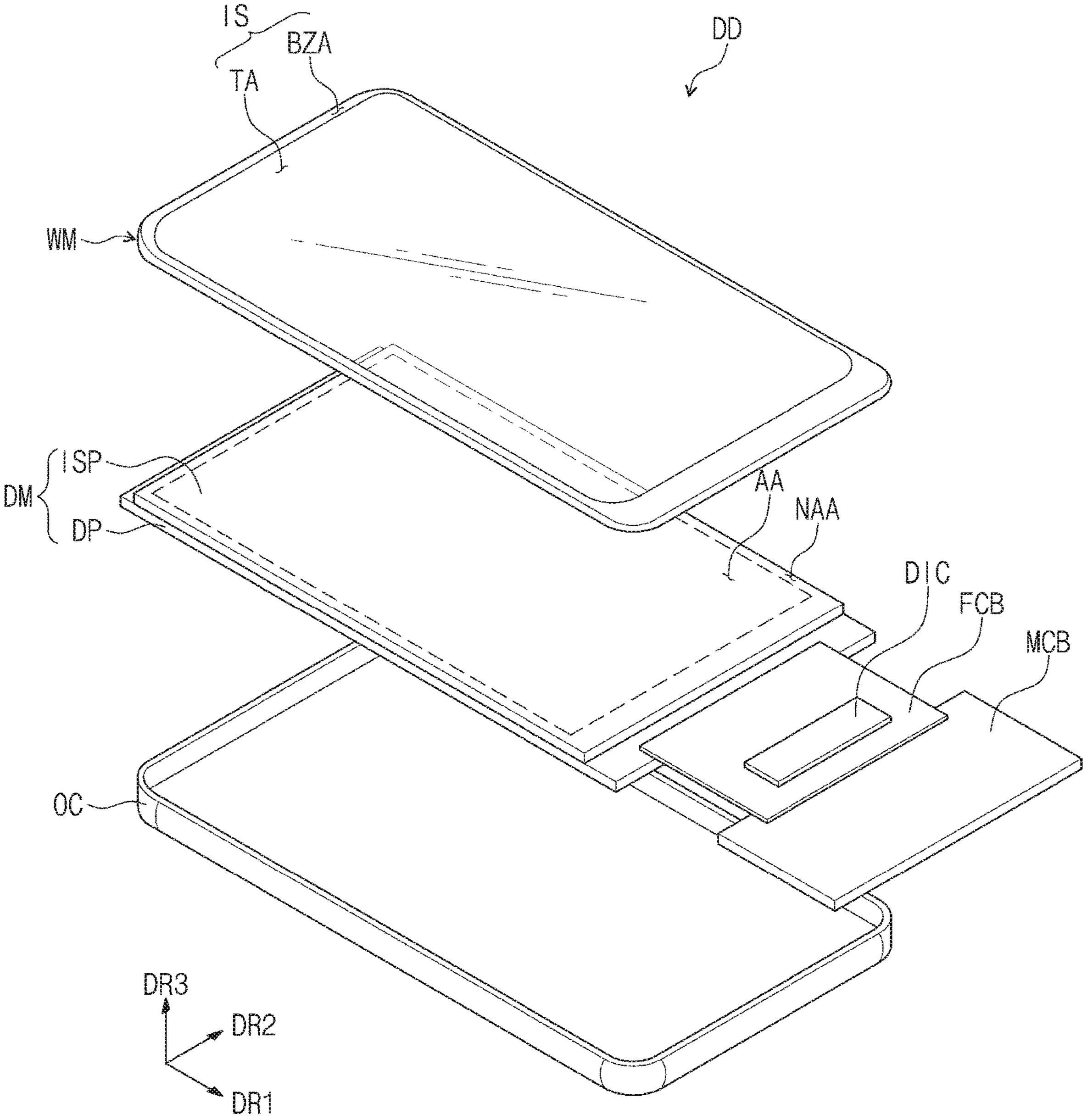
FIG. 2 is an exploded perspective view of a display device illustrated in FIG. 1.

FIG. 1 is a perspective view of a display device according to an embodiment of the present disclosure. FIG. 2 is an exploded perspective view of a display device illustrated in FIG. 1.

Referring to FIGS. 1 and 2, a display device DD may be a device that is activated depending on an electrical signal. The display device DD according to the present disclosure may be a small and medium-sized electronic device, such as, for example, a mobile phone, a tablet, a vehicle navigation system, or a game console, as well as a large-sized electronic device, such as, for example, a television, a billboard, or a monitor. The electronic devices listed above are only examples, and it is obvious that the display device DD may be applied to any other electronic device(s) without departing from the concept of the present disclosure.

The display device DD is in the shape of a rectangle having a long edge (or side) in a first direction DR1 and a short edge (or side) in a second direction DR2 intersecting the first direction DR1. A corner where the short side in second direction DR2 and the long side in the first direction DR1 meet may be formed to have a round shape with a predetermined curvature or have a right-angled shape. However, the shape of the display device DD is not limited thereto. For example, the display device DD may be implemented in various shapes such as, for example, a circular shape, an oval shape, an atypical shape, or another polygonal shape such as, for example, a triangle, a pentagon or a hexagon. The display device DD may display an image IM on a display surface IS parallel to each of the first direction DR1 and the second direction DR2, so as to face a third direction DR3. For example, the display device DD may display the image IM towards the third direction DR3. The display surface IS on which the image IM is displayed may correspond to a front surface of the display device DD. The image IM includes not only a moving image, but also a still image.

In this embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3. While the display device DD having a flat shape is illustrated in FIG. 1, the display device DD according to an embodiment of the present disclosure may include a 3D-type display surface or a curved display surface.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input TC of a user US, which is applied from the outside. The external input TC of the user US may be one of various types of external inputs, such as, for example, a part of the user's body, light, heat, and pressure, or a combination thereof. In addition, the display device DD may detect inputs that contact and also are close to or adjacent to the display device DD. In this embodiment, an example in which the external input TC of the user US is a touch input by a hand of the user US is described, but the present disclosure is not limited thereto. For example, as described above, the external input TC of the user US may be provided in various types. Also, the display device DD may sense the external input TC of the user US applied to a side surface or a rear surface of the display device DD depending on a structure of the display device DD and is not limited to one embodiment.

The display device DD according to an embodiment of the present disclosure may sense a second input that is applied from the outside. The second input may include inputs by an input device (e.g., a stylus pen, an active pen, a touch pen, an electronic pen, an e-pen, or the like) in addition to the hand of the user US.

The front surface of the display device DD may be divided into a transmission area TA and a bezel area BZA. The transmission area TA may be an area in which the image IM is displayed. The transmission area TA may be an optically transparent area. For example, the transmission area TA may exhibit a light transmittance of about 90% or greater in a visible light area. The user US visually perceives the image IM through the transmission area TA. In this embodiment, the transmission area TA is illustrated in the shape of a quadrangle whose vertexes are rounded. However, this is illustrated as an example. The transmission area TA may have various shapes and may not be limited to any one embodiment.

The bezel area BZA is adjacent to the transmission area TA. The bezel area BZA may be an area having a relatively low light transmittance compared to the transmission area TA, and may include an opaque material that blocks a light. The bezel area BZA may have a given color. The bezel area BZA may surround the transmission area TA. As such, a shape of the transmission area TA may be defined substantially by the bezel area BZA. For example, the bezel area BZA may be located outside the transmission area TA. However, this is illustrated as an example. The bezel area BZA may be disposed adjacent to only one side of the transmission area TA or may be omitted. The display device DD according to an embodiment of the present disclosure may include various embodiments and is not limited to any one embodiment.

As illustrated in FIG. 2, the display device DD may include a display module DM and a window WM disposed on or over the display module DM. The display module DM includes a display panel DP and an input sensor ISP disposed on or over the display panel DP.

The display panel DP according to an embodiment of the present disclosure may be a light-emitting display panel. The display panel DP may be, for example, an organic light-emitting display panel, an inorganic light-emitting display panel, or a quantum dot light-emitting display panel. An emission layer of the organic light-emitting display panel may include an organic light-emitting material. An emission layer of the inorganic light-emitting display panel may include an inorganic light-emitting material. An emission layer of the quantum dot light-emitting display panel may include a quantum dot, a quantum rod, etc. The quantum dot and the quantum rod may be small semiconductor particles which are several nanometers in size. The inorganic light-emitting material may include crystalline semiconductors such as, for example, gallium nitride, indium phosphide, etc. Alternatively, the display panel DP according to an embodiment of the present disclosure may include an organic material and a quantum dot, or may include an inorganic material and a quantum dot. Below, the description will be given under the condition that the display panel DP is an organic light-emitting display panel in an embodiment of the present disclosure.

The display panel DP may output the image IM, and the output image IM may be displayed on the display surface IS. For example, the image IM may be displayed on the transmission area TA of the display surface IS. The input sensor ISP may be disposed on the display panel DP to sense the external input TC and the second input. A configuration and an operation of the input sensor ISP will be described with reference to FIGS. 4 and 5.

The window WM may be formed of a transparent material capable of outputting the image IM. For example, the window WM may be formed of glass, sapphire, plastic, or the like. An example in which the window WM is implemented with a single layer is illustrated, but the present disclosure is not limited thereto. For example, the window WM may include a plurality of layers. For example, the window WM may have a laminated structure of a plurality of plastic films bonded with an adhesive, or may have a laminated structure of a glass substrate and a plastic film bonded with an adhesive. In the case of a flexible display device, a plastic film that has excellent ductility may be used to form the window WM.

The bezel area BZA of the display device DD described above may correspond to an area that is defined by printing a material including a given color on one area of the window WM. In an embodiment of the present disclosure, the window WM may include a light blocking pattern for defining the bezel area BZA. The light blocking pattern that is a colored organic film may be formed, for example, in a coating manner. For example, when the window WM is provided as a glass or plastic substrate, the bezel area BZA may be a color layer printed or deposited on one side of a glass or plastic substrate. For example, the bezel area BZA may be formed by coloring the corresponding area of the glass or plastic substrate.

The window WM may be coupled to the display module DM by an adhesive film. In an embodiment of the present disclosure, the adhesive film may include an optically clear adhesive (OCA) film. The optically clear adhesive OCA film may be formed from a pre-coated film or from a liquid paste. In general, the optically clear adhesive OCA may require optical clarity and may provide shock resistance. However, the adhesive film is not limited thereto. For example, the adhesive film may include a typical adhesive or sticking agent. For example, the adhesive film may include an optically clear resin (OCR) film or a pressure sensitive adhesive (PSA) film.

An anti-reflection layer may be further disposed between the window WM and the display module DM. The anti-reflection layer decreases reflectivity of an external light incident from above the window WM. The anti-reflection layer according to an embodiment of the present disclosure may include a retarder and a polarizer. The retarder may have a film type or a liquid crystal coating type and may include a 212 retarder and/or a 214 retarder. In an embodiment of the present disclosure, the anti-reflection layer may include two layers of retarder with a first retarder having a $\lambda/2$ retardation value, and a second retarder positioned below the first retarder and having a $\lambda/4$ retardation value. The polarizer may also have a film type or a liquid crystal coating type. The film type may include a stretch-type synthetic resin film, and the liquid crystal coating type may include liquid crystals arranged in a given direction. The film-type polarizer may be a uniaxially stretched film or a biaxially stretched film. The retarder and the polarizer may be implemented with one polarization film.

The display module DM may display an image depending on an electrical signal and may transmit/receive information about an external input. The display module DM may be defined by an active area AA and a non-active area NAA. The active area AA may be defined as an area through which an image IM provided from the display module DM is output. For example, the image IM may be provided from the display panel DP of the display module DM. Also, the active area AA may be defined as an area in which the input sensor ISP senses the external input TC and the second input applied from the outside.

The non-active area NAA is adjacent to the active area AA. For example, the non-active area NAA may surround the active area AA. The non-active area NAA may be covered by the bezel area BZA and not be visible from the outside. However, this is illustrated as an example. The non-active area NAA may be defined in various shapes, not limited to any one embodiment. According to an embodiment of the present disclosure, the active area AA of the display module DM may correspond to at least a portion of the transmission area TA.

The display module DM may include a main circuit board MCB, a flexible circuit film FCB, and a driver chip DIC. The main circuit board MCB may be connected with the flexible circuit film FCB so as to be electrically connected with the display panel DP. The flexible circuit film FCB may be connected with the display panel DP such that the display panel DP and the main circuit board MCB are electrically connected. Meanwhile, in an embodiment of the present disclosure, the flexible circuit film FCB may be omitted, and the main circuit board MCB may be directly connected to the display panel DP at this time.

The main circuit board MCB may include a plurality of driver devices, or connectors for power supply. The plurality of driver devices may include a circuit part for driving the display panel DP. The plurality of driver devices may include a main driving part MCP (refer to FIG. 7). The driver chip DIC may be mounted on the flexible circuit film FCB. The flexible circuit film FCB may include an insulating film and conductive wires mounted on the insulating film. An example in which the display device DD according to an embodiment of the present disclosure includes one flexible circuit film FCB is illustrated, but the present disclosure is not limited thereto. For example, the display device DD may include a plurality of flexible circuit films capable of being connected with the display panel DP. A structure in which the driver chip DIC is mounted on the flexible circuit film FCB is illustrated in FIG. 2, but the present disclosure is not limited thereto. For example, the driver chip DIC may be directly mounted on the display panel DP. In this case, a portion of the display panel DP, on which the driver chip DIC is mounted, may be bent such that the driver chip DIC is disposed on a rear surface of the display module DM. Also, the driver chip DIC may be directly mounted on the main circuit board MCB.

The input sensor ISP may be electrically connected with the main circuit board MCB through the flexible circuit film FCB. For example, the flexible circuit film FCB may be connected to pads of the input sensor ISP disposed in the non-active area NAA, and may electrically connect the main circuit board MCB and the input sensor ISP. However, the present disclosure is not limited thereto. For example, the display module DM may further include a separate flexible circuit film for electrically connecting the input sensor ISP and the main circuit board MCB.

The display device DD further includes an outer case OC accommodating the display module DM. The outer case OC may be coupled with the window WM to define the exterior of the display device DD. For example, the window WM and the outer case OC may be combined to define the appearance of the display device DD. The display module DM, the flexible circuit film FCB and the main circuit board MCB may be enclosed by the window WM and the outer case OC. In an embodiment of the present disclosure, the window WM may couple with the outer case OC to fix in place the display module DM, the flexible circuit film FCB and the main circuit board MCB. The outer case OC may absorb external shocks and may prevent a foreign material/moisture or the like from being infiltrated into the display module DM such that components accommodated in the outer case OC are protected. Meanwhile, in an embodiment of the present disclosure, the outer case OC may be provided in the form of a combination of a plurality of accommodating members.

The display device DD according to an embodiment of the present disclosure may further include an electronic module including various functional modules for operating the display module DM, a power supply module for supplying a power necessary for overall operations of the display device DD, a bracket coupled with the display module DM and/or the outer case OC to partition an inner space of the display device DD, etc.

Figure 3:
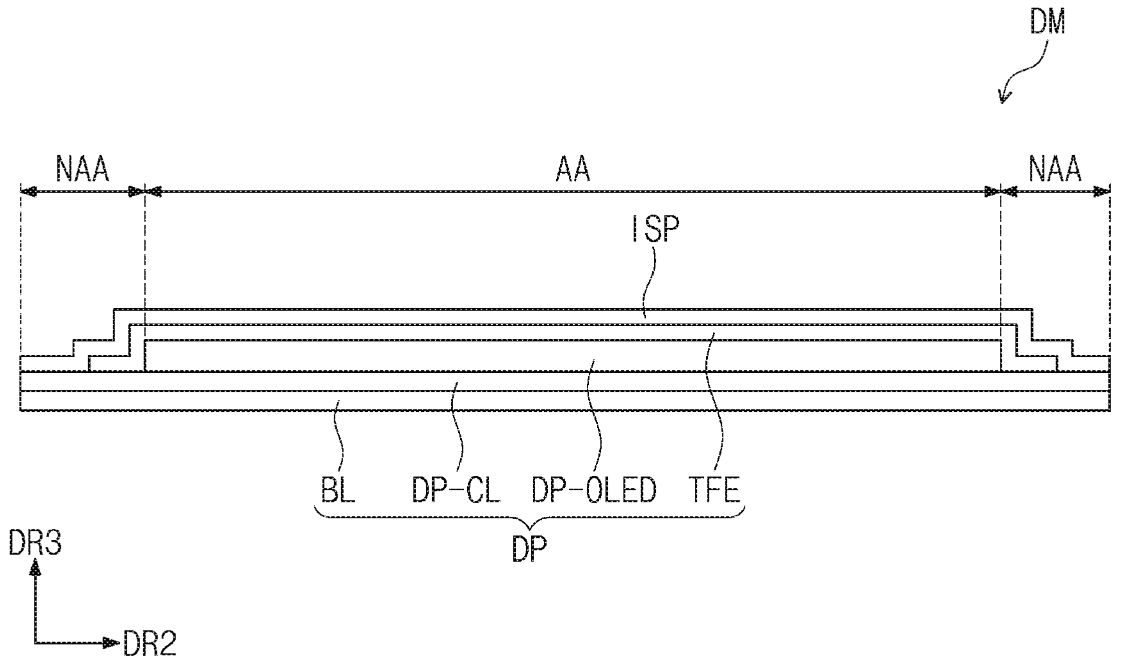
FIG. 3 is a cross-sectional view of a display module illustrated in FIG. 2.

FIG. 3 is a cross-sectional view of a display module illustrated in FIG. 2.

Referring to FIG. 3, the display module DM includes the display panel DP and the input sensor ISP. The display panel DP includes a base layer BL, a circuit element layer DP-CL disposed on the base layer BL, a display element layer DP-OLED, and an encapsulation layer TFE. The display panel DP may further include an optical functional layer such as an anti-reflection layer and/or a refractive index control layer. The optical functional layer may reduce reflectance of a light (external light) incident from the outside towards the display device DD, and enhance color purity of a light emitted from the display device DD.

The base layer BL may include at least one plastic film. The base layer BL may include, for example, a plastic substrate, a glass substrate, a metal substrate, or an organic/inorganic composite substrate. In an embodiment of the present disclosure, the base layer BL may be a flexible substrate. For example, when the base layer BL is a flexible substrate, the base layer may include a polymer resin, and may be foldable, rollable, and/or bendable. The active area AA and the non-active area NAA described with reference to FIG. 2 may be equally defined in the base layer BL.

The circuit element layer DP-CL includes at least one intermediate insulating layer and a circuit element. The intermediate insulating layer includes at least one intermediate inorganic layer and at least one intermediate organic layer. The circuit element includes signal lines, a driving circuit of a pixel, etc. The driving circuit of the pixel may include a transistor.

The display element layer DP-OLED includes a light-emitting element. The light-emitting element may include at least one organic light-emitting diode OLED. The display element layer DP-OLED may further include an organic film such as a pixel defining film.

The encapsulation layer TFE seals the display element layer DP-OLED. The encapsulation layer TFE includes at least one inorganic layer. The encapsulation layer TFE may further include at least one organic layer. The inorganic layer protects the display element layer DP-OLED from moisture/oxygen, and the organic layer protects the display element layer DP-OLED from a foreign material such as a dust particle. The inorganic layer may include, for example, a silicon nitride ($Si_3N_4$) layer, a silicon oxynitride (SiON) layer, a silicon oxide ($SiO_2$) layer, a titanium oxide ($TiO_2$) layer, or an aluminum oxide ($Al_2O_3$) layer. The organic layer may include a polymer-based material. Examples of the polymer-based material may include, for example, an acrylic resin, an epoxy resin, polyimide, and/or polyethylene. In an embodiment of the present disclosure, the organic layer may include an acrylic-based organic layer.

The input sensor ISP may be formed on the display panel DP by a continuous process. Also, the input sensor ISP and the display panel DP may be coupled to each other by an adhesive film. The input sensor ISP may have a multi-layer structure. The input sensor ISP may include a single insulating layer or multiple insulating layers. According to an embodiment of the present disclosure, when the input sensor ISP is directly disposed on the display panel DP by a continuous process, the input sensor ISP is directly disposed on the encapsulation layer TFE, and an adhesive film is not disposed between the input sensor ISP and the display panel DP. However, in an embodiment of the present disclosure, an adhesive film may be disposed between the input sensor ISP and the display panel DP. In this case, the input sensor ISP is not manufactured by a process continuous to that of the display panel DP. That is, the input sensor ISP may be manufactured through a process separate from that of the display panel DP and may then be fixed on an upper surface of the display panel DP by an adhesive film.

In an embodiment of the present disclosure, the display panel DP may further include an encapsulation substrate. The encapsulation substrate may be disposed on the display element layer DP-OLED so as to face the base layer BL. The encapsulation substrate may include, for example, a plastic substrate, a glass substrate, a metal substrate, or an organic/inorganic composite material substrate. According to an embodiment of the present disclosure, the encapsulation substrate may include, for example, glass, and the glass may be ultra-thin glass (UTG). A sealant may be disposed between the encapsulation substrate and the base layer BL, and the encapsulation substrate and the base layer BL may be coupled to each other by the sealant. The sealant may include an organic adhesive or a frit being a ceramic adhesive material. The display element layer DP-OLED may be sealed by the sealant and the encapsulation substrate.

When the input sensor ISP is directly disposed on the display panel DP by a continuous process, the input sensor ISP may be directly disposed on the encapsulation substrate. However, in an embodiment of the present disclosure, when an adhesive film is disposed between the input sensor ISP and the display panel DP, the input sensor ISP may be fixed on the upper surface of the encapsulation substrate by the adhesive film.

Figure 4:
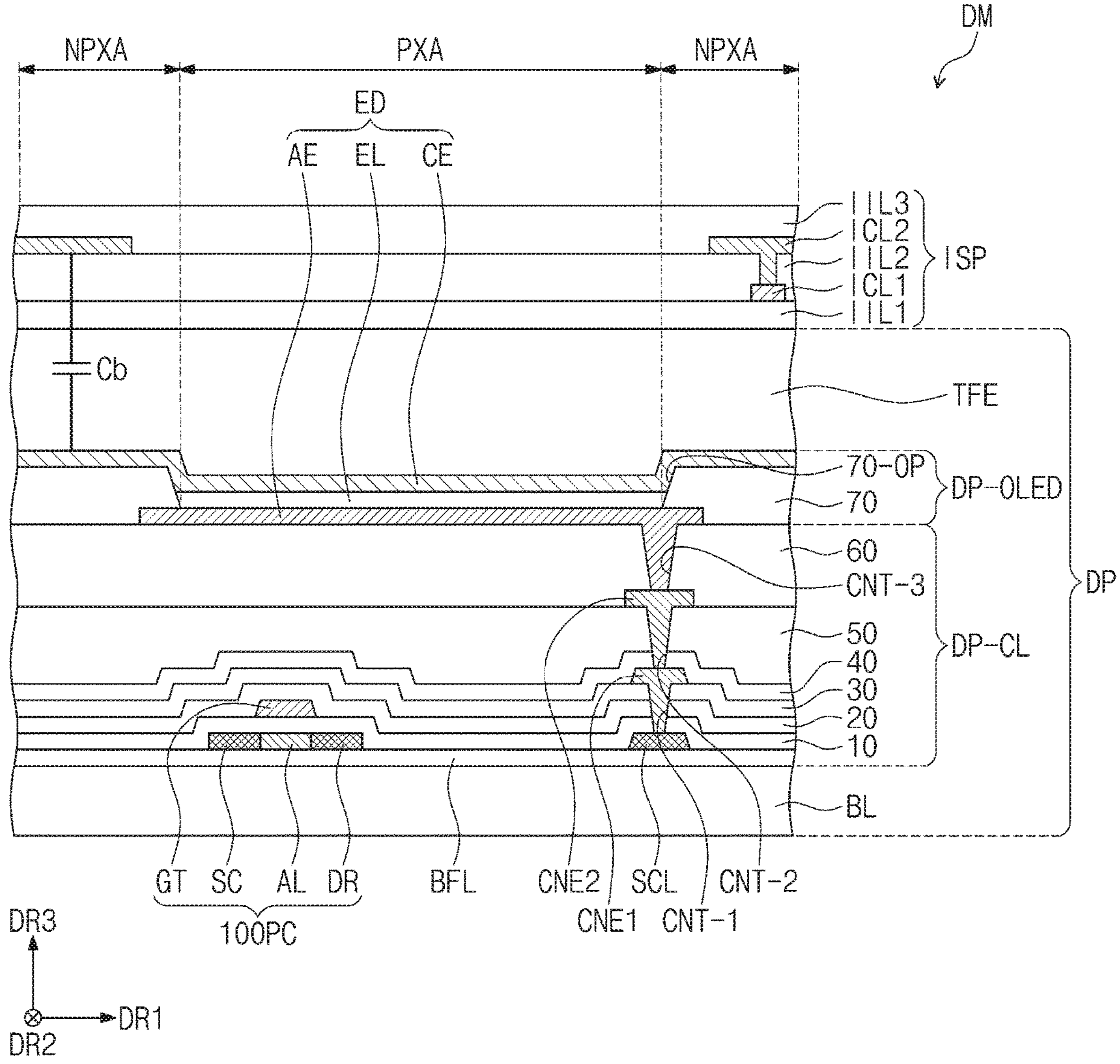
FIG. 4 is an enlarged cross-sectional view of a display module according to an embodiment of the present disclosure.

FIG. 4 is an enlarged cross-sectional view of a display module according to an embodiment of the present disclosure.

Referring to FIG. 4, at least one inorganic layer is formed on an upper surface of the base layer BL. The inorganic layer may include at least one of, for example, aluminum oxide ($Al_2O_3$), titanium oxide ($TiO_2$), silicon oxide ($SiO_2$), silicon nitride ($Si_3N_4$), silicon oxynitride (SiON), zirconium oxide ($ZrO_2$), or hafnium oxide ($HfO_2$). The inorganic layer may be formed of multiple layers. The multiple inorganic layers may constitute a barrier layer and/or a buffer layer. In this embodiment, the display panel DP is illustrated as including a buffer layer BFL.

The buffer layer BFL may enhance a bonding force between the base layer BL and the semiconductor pattern. The buffer layer BFL may be configured to reduce or block penetration of foreign materials, moisture, or ambient air from a bottom portion of the base layer BL and may provide a flat surface on the base layer BL. The buffer layer BFL may include at least one of, for example, silicon oxide ($SiO_2$), silicon nitride ($Si_3N_4$), or silicon oxynitride (SiON). For example, the buffer layer BFL may include a structure in which a silicon oxide ($SiO_2$) layer and a silicon nitride ($Si_3N_4$) layer are stacked alternately.

The semiconductor pattern may be disposed on the buffer layer BFL. The semiconductor pattern may include polysilicon (p-Si). However, the present disclosure is not limited thereto, and the semiconductor pattern may include, for example, amorphous silicon (a-Si), low-temperature polycrystalline silicon (LTPS), or oxide semiconductor.

FIG. 4 only illustrates a portion of the semiconductor pattern, and the semiconductor pattern may be further disposed in another area. Semiconductor patterns may be arranged across pixels in a specific rule. An electrical property of the semiconductor pattern may vary depending on whether it is doped or not. The semiconductor pattern may include a first area having higher conductivity and a second area having lower conductivity. The first area may be doped with an N-type dopant or a P-type dopant. The N-type dopants may include, for example, phosphorus (P), arsenic (As), etc. The P-type dopants may include, for example, boron (B), aluminum (Al), gallium (Ga), etc. A P-type transistor may include a doping area doped with the P-type dopant, and an N-type transistor may include a doping area doped with the N-type dopant. The second area may be a non-doping area or may be an area doped at a lower concentration than the first area.

The conductivity of the first area may be higher than the conductivity of the second area, and the first area may substantially serve as an electrode or a signal line. The second area may correspond to an active (or channel) of a transistor substantially. In other words, a portion of the semiconductor pattern may be an active of a transistor, another portion thereof may be a source or a drain of the transistor, and the other portion thereof may be a connection electrode or a connection signal line.

Each of pixels may be expressed by an equivalent circuit including 7 transistors, one capacitor, and a light-emitting element ED, and the equivalent circuit of the pixel may be modified in various forms. In an embodiment of the present disclosure, for driving the light-emitting element ED, the light-emitting element ED may be connected to a pixel circuit which includes two or more transistors and one or more capacitors. One transistor 100PC and one light-emitting element ED included in a pixel are illustrated in FIG. 4 as an example.

A source SC, an active AL, and a drain DR of the transistor 100PC may be formed from the semiconductor pattern. The source SC and the drain DR may extend from the active AL in directions facing away from each other in a cross-sectional view, and may be arranged respectively on opposite sides of the active AL (i.e., the channel region). A portion of a connection signal line SCL forming from the semiconductor pattern is illustrated in FIG. 4. The connection signal line SCL may be connected with the drain DR of the transistor 100PC in a plan view.

A first insulating layer 10 may be disposed on the buffer layer BFL, may overlap a plurality of pixels in common, and may cover the semiconductor pattern. The first insulating layer 10 may be an inorganic layer and/or an organic layer, and may have a single-layer or multi-layer structure. The first insulating layer 10 may include at least one of, for example, aluminum oxide ($Al_2O_3$), titanium oxide ($TiO_2$), silicon oxide ($SiO_2$), silicon nitride ($Si_3N_4$), silicon oxynitride (SiON), zirconium oxide ($ZrO_2$), or hafnium oxide ($HfO_2$) In an embodiment of the present disclosure, the first insulating layer 10 may be a single silicon oxide ($SiO_2$) layer. An insulating layer of the circuit element layer DP-CL to be described later as well as the first insulating layer 10 may be an inorganic layer and/or an organic layer, and may have a single-layer structure or a multi-layer structure. The inorganic layer may include at least one of the materials described above but is not limited thereto.

A gate GT of the transistor 100PC is disposed on the first insulating layer 10. The gate GT may be a part of a metal pattern. The gate GT overlaps the active AL. The gate GT may function as a mask in the process of doping the semiconductor pattern. For example, the source SC and the drain DR of the transistor 100PC may be formed by doping the semiconductor pattern with an N-type dopant or a P-type dopant using the gate GT as a mask in the doping process.

A second insulating layer 20 may be disposed on the first insulating layer 10 and may cover the gate GT. The second insulating layer 20 may overlap the pixels in common. The second insulating layer 20 may be an inorganic layer and/or an organic layer, and may have a single-layer or multi-layer structure. The second insulating layer 20 may include at least one of, for example, silicon oxide ($SiO_2$), silicon nitride ($Si_3N_4$), or silicon oxynitride (SiON). In this embodiment, the second insulating layer 20 may have a multi-layer structure including a silicon oxide ($SiO_2$) layer and a silicon nitride ($Si_3N_4$) layer.

A third insulating layer 30 may be disposed on the second insulating layer 20. The third insulating layer 30 may have a single-layer or multi-layer structure. For example, the third insulating layer 30 may have a multi-layer structure including a silicon oxide ($SiO_2$) layer and a silicon nitride ($Si_3N_4$) layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide ($SiO_2$) layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected with the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The display element layer DP-OLED may be disposed on the circuit element layer DP-CL, and may include the light-emitting element ED. For example, the display element layer DP-OLED may include, for example, an organic light emitting material, a quantum dot, a quantum rod, a micro-LED, or a nano-LED. Below, the description will be given under the condition that the light-emitting element ED is an organic light-emitting element. For example, the light-emitting element ED may include at least one organic light-emitting diode OLED, but the present disclosure is not limited thereto.

The light-emitting element ED may include a first electrode AE, an emission layer EL, and a second electrode CE. The first electrode AE may also be referred to as a pixel electrode or an anode electrode, and the second electrode CE may also be referred to as a common electrode or a cathode electrode.

The first electrode AE may be disposed on the sixth insulating layer 60. The first electrode AE may be connected with the second connection electrode CNE2 through a contact hole CNT-3 penetrating the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE. In an embodiment of the present disclosure, the pixel defining layer 70 may include an organic material such as, for example, polyimide, but the present disclosure is not limited thereto.

The active area AA (refer to FIG. 3) may include an emission area PXA and a non-emission area NPXA adjacent to the emission area PXA. The non-emission area NPXA may surround the emission area PXA. In this embodiment, the emission area PXA is defined to correspond to a partial area of the first electrode AE, which is exposed by the opening 70-OP.

A light-emitting layer EL may be disposed on the first electrode AE. The light-emitting layer EL may be disposed in an area defined by the opening 70-OP. That is, the light-emitting layer EL may be independently disposed for each pixel. The light emitting layer EL may emit light in response to a potential difference between the first electrode AE and the second electrode CE. For example, when an anode voltage is applied to the first electrode AE and a cathode voltage is applied to the second electrode CE, the holes and electrons move to the light-emitting layer EL, such that they combine in the light-emitting layer EL to emit light. In the case where the light-emitting layer EL is independently disposed for each pixel, each of the light-emitting layers EL may emit a light of at least one of a blue color, a red color, or a green color. However, the present disclosure is not limited thereto. For example, the light-emitting layer EL may be provided to be connected in common with the pixels. In this case, the light-emitting layer EL may provide a blue color or may provide a white color. In an embodiment of the present disclosure, the light-emitting layer EL may include at least one of materials emitting red, green, blue, or white light, and may include a fluorescent material or a phosphorescent material.

The second electrode CE may be disposed on the light-emitting layer EL, and may be integrally disposed in a plurality of pixels in common. In an embodiment of the present disclosure, the second electrode CE may include a transparent conductive material or a semi-transparent conductive material. Accordingly, light generated in the light-emitting layer EL may be easily emitted toward the third direction DR3 through the second electrode CE.

A hole control layer may be interposed between the first electrode AE and the light emitting layer EL. The hole control layer may be disposed in common in the emission region PXA and the non-emission region NPXA. The hole control layer may include a hole transport layer and may further include a hole injection layer. An electron control layer may be disposed between the light-emitting layer EL and the second electrode CE. The electron control layer may include an electron transport layer and may further include an electron injection layer. The hole control layer and the electron control layer may be formed in common at a plurality of pixels by using an open mask. Thus, the light-emitting layer EL may generate a color light corresponding to each of the pixels, and may be interposed between the hole transport layer and the electron transport layer.

The encapsulation layer TFE may be disposed on the display element layer DP-OLED. The encapsulation layer TFE may cover the display element layer DP-OLED to prevent the display element layer DP-OLED from being damaged or degraded by external impurities. The encapsulation layer TFE may include an inorganic layer, an organic layer, and an inorganic layer sequentially stacked, and layers constituting the encapsulation layer TFE are not limited thereto.

The inorganic layer protects the display element layer DP-OLED from moisture/oxygen, and the organic layer protects the display element layer DP-OLED from a foreign material such as a dust particle. The inorganic layers may include, for example, a silicon nitride ($Si_3N_4$) layer, a silicon oxynitride (SiON) layer, a silicon oxide ($SiO_2$) layer, a titanium oxide ($TiO_2$) layer, an aluminum oxide ($Al_2O_3$) layer, or the like. The organic layer may include an acrylic-based organic layer but is not limited thereto. In an embodiment of the present disclosure, the two inorganic layers may be deposited to directly contact each other in an edge area of the display device DD, and thus the two inorganic layers may seal the organic layer such that the organic layer is not exposed to the outside. Accordingly, external moisture or oxygen may be prevented or reduced from being infiltrated into the display area through the organic layer.

The input sensor ISP may include a base insulating layer IIL1, a first conductive layer ICL1, a sensing insulating layer IIL2, a second conductive layer ICL2, and a cover insulating layer IIL3.

The base insulating layer IIL1 may be an inorganic layer including at least one of, for example, silicon nitride ($Si_3N_4$), silicon oxynitride (SiON), or silicon oxide ($SiO_2$) Alternatively, the base insulating layer IIL1 may be an organic layer including, for example, an epoxy resin, an acrylic resin, or an imide-based resin. The base insulating layer IIL1 may have a single-layer structure or may have a multi-layer structure in which a plurality of layers are stacked in the third direction DR3.

Each of the first conductive layer ICL1 and the second conductive layer ICL2 may have a single-layer structure or may have a structure in which multiple layers are stacked in the third direction DR3.

Each of the first conductive layer ICL1 and the second conductive layer ICL2 includes a plurality of conductive patterns. The conductive patterns may include a plurality of sensing electrodes SE1_1 to SE1_5 and SE2_1 to SE2_4 (refer to FIG. 5) and a plurality of signal lines SL1_1 to SL1_5 and SL2_1 to SL2_4 (refer to FIG. 5) respectively connected with the plurality of sensing electrodes SE1_1 to SE1_5 and SE2_1 to SE2_4.

Each of the first conductive layer ICL1 and the second conductive layer ICL2 having the single-layer structure may include a metal layer or a transparent conductive layer. The metal layer may include, for example, molybdenum (Mo), silver (Ag), titanium (Ti), copper (Cu), aluminum (Al), or an alloy thereof. The transparent conductive layer may include transparent conductive oxide such as, for example, indium tin oxide (ITO), indium zinc oxide (IZO), zinc oxide (ZnO), or indium zinc tin oxide (IZTO). In addition, the transparent conductive layer may include conductive polymer such as poly-(3,4)-ethylene-dihydroxy thiophene (PEDOT), metal nanowire, or graphene.

Each of the first conductive layer ICL1 and the second conductive layer ICL2 having the multi-layer structure may include metal layers. The metal layers may have, for example, a three-layer structure of titanium/aluminum/titanium (Ti/Al/Ti) or molybdenum/copper/molybdenum (Mo/Cu/Mo). The conductive layer of the multi-layer structure may include at least one metal layer and at least one transparent conductive layer.

At least one of the sensing insulating layer IIL2 or the cover insulating layer IIL3 may include an inorganic layer. The inorganic layer may include at least one of, for example, aluminum oxide ($Al_2O_3$), titanium oxide ($TiO_2$), silicon oxide ($SiO_2$), silicon nitride ($Si_3N_4$), silicon oxynitride (SiON), zirconium oxide ($ZrO_2$), or hafnium oxide ($HfO_2$).

At least one of the sensing insulating layer IIL2 or the cover insulating layer IIL3 may include an organic layer. The organic layer may include at least one of, for example, acrylate-based resin, methacrylate-based resin, polyisoprene-based resin, vinyl-based resin, epoxy-based resin, urethane-based resin, cellulose-based resin, siloxane-based resin, polyimide-based resin, polyamide-based resin, or perylene-based resin.

A parasitic capacitance Cb may be present between the input sensor ISP and the second electrode CE. The parasitic capacitance Cb may also be referred to as a "base capacitance". As a distance between the input sensor ISP and the second electrode CE decreases, a value of the parasitic capacitance Cb may become greater. The greater the parasitic capacitance Cb, the smaller the ratio of a variation in capacitance to a reference value. The variation in capacitance means a change in a capacitance that occurs before and after an input by an input means, for example, the body of the user US (refer to FIG. 1).

A sensor driving part ICP (refer to FIG. 5) that processes a signal sensed by the input sensor ISP may perform a leveling operation of removing a value corresponding to the parasitic capacitance Cb from the sensed signal. The ratio of the variation in capacitance to the reference value may be increased by the leveling operation, and thus, the sensitivity of sensing may be enhanced.

The input sensor ISP may be disposed over the second electrode CE. The encapsulation layer TFE may be disposed between the second electrode CE and the input sensor ISP. The second electrode CE may generate a reference voltage of the display panel DP. For example, the second electrode CE may be connected with a second voltage line VL2 (refer to FIG. 6B) to generate a second driving voltage ELVSS (refer to FIG. 6B). That is, the second electrode CE may include a power electrode.

In an embodiment of the present disclosure, the second electrode CE may be disposed between the first electrode AE and the light-emitting layer EL and the input sensor ISP and may prevent a noise, which depends on the influence by the display panel DP, from occurring in the input sensor ISP. That is, the second electrode CE may play a role of shielding the input sensor ISP from the light-emitting layer EL and the first electrode AE.

Figure 5:
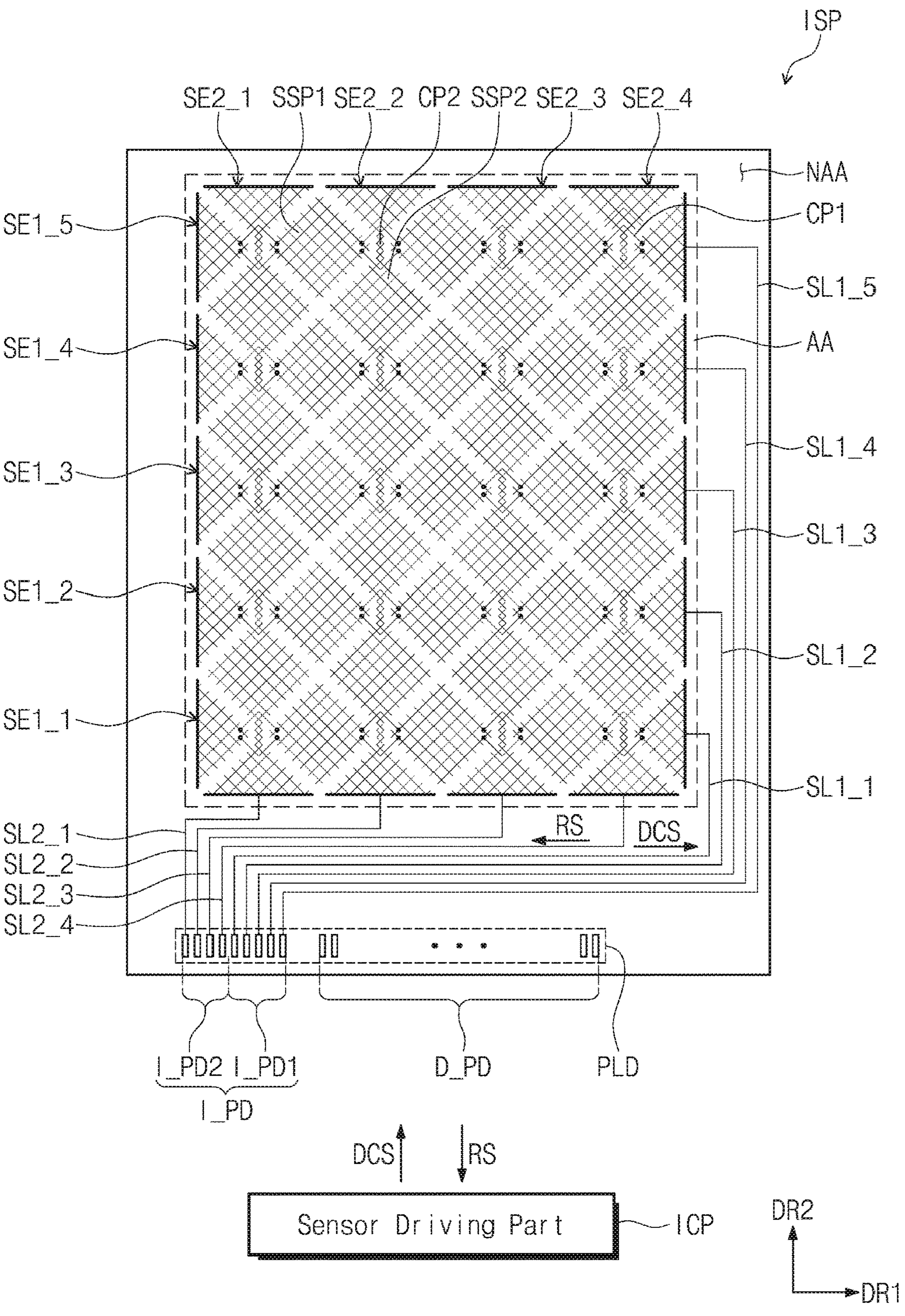
FIG. 5 is a plan view illustrating a configuration of a sensor driving part and an input sensor according to an embodiment of the present disclosure.

FIG. 5 is a plan view illustrating a configuration of a sensor driving part and an input sensor according to an embodiment of the present disclosure.

Referring to FIG. 5, the input sensor ISP according to an embodiment of the present disclosure includes the active area AA and the non-active area NAA adjacent to the active area AA. The non-active area NAA may surround the active area AA. A plurality of sensing electrodes SE1_1 to SE1_5 and SE2_1 to SE2_4 may be disposed in the active area AA, and a plurality of signal lines SL1_1 to SL1_5 and SL2_1 to SL2_4 may be disposed in the non-active area NAA.

In an embodiment of the present disclosure, the sensing electrodes SE1_1 to SE1_5 and SE2_1 to SE2_4 include transmit electrodes SE1_1 to SE1_5 and receive electrodes SE2_1 to SE2_4.

The signal lines SL1_1 to SL1_5 and SL2_1 to SL2_4 may include transmit signal lines SL1_1 to SL1_5 connected with the transmit electrodes SE1_1 to SE1_5 and receive signal lines SL2_1 to SL2_4 connected with the receive electrodes SE2_1 to SE2_4.

The transmit electrodes SE1_1 to SE1_5 and the receive electrodes SE2_1 to SE2_4 cross each other. The transmit electrodes SE1_1 to SE1_5 are arranged to be spaced apart from each other in the second direction DR2 and extend in the first direction DR1. The receive electrodes SE2_1 to SE2_4 are arranged to be spaced apart from each other in the first direction DR1 and extend in the second direction DR2. Since the receive electrodes SE2_1 to SE2_4 are longer than the transmit electrodes SE1_1 to SE1_5, a voltage drop of a detection signal (or a transmission signal) occurs and thus sensing sensitivity may be reduced. According to an embodiment of the present disclosure, unlike shown in FIG. 5, a detection signal (or a transmission signal) is provided through the receive signal lines SL2_1 to SL2_4 connected to two opposite ends of the receive electrodes SE2_1 to SE2_4, a voltage drop of a detection signal (or a transmission signal) may be prevented and thus reduction of sensing sensitivity may be prevented.

The input sensor ISP described above may obtain coordinate information in a mutual-capacitive sensing manner A capacitance is formed between the transmit electrodes SE1_1 to SE1_5 and the receive electrodes SE2_1 to SE2_4. The capacitance between the transmit electrodes SE1_1 to SE1_5 and the receive electrodes SE2_1 to SE2_4 may be changed by the external input TC (refer to FIG. 1) by a body of the user US (refer to FIG. 1). In an embodiment of the present disclosure, the capacitance between the transmit electrodes SE1_1 to SE1_5 and the receive electrodes SE2_1 to SE2_4 may be changed by an external input caused by an input device other than the body of the user US. Herein, the sensing sensitivity of the input sensor ISP may be determined depending on a variation of the capacitance. However, the present disclosure is not limited thereto, and the input sensor ISP may obtain coordinate information in a self-capacitive sensing method. One of the transmit electrodes SE1_1 to SE1_5 and one of the receive electrodes SE2_1 to SE2_4 may be integrated into one sensing electrode so as to sense the external input TC.

In an embodiment of the present disclosure, the input sensor ISP is not limited to one of the mutual-capacitive sensing manner and the self-capacitive sensing manner in obtaining coordinate information. The input sensor ISP may obtain the coordinate information by using both the mutual-capacitive sensing manner and the self-capacitive sensing manner.

Each of the transmit electrodes SE1_1 to SE1_5 includes a first sensor part SSP1 and a first connection part CP1 disposed in the active area AA. Each of the receive electrodes SE2_1 to SE2_4 includes a second sensor part SSP2 and a second connection part CP2 disposed in the active area AA.

Two first sensor parts SSP1 disposed at opposite ends of one of the transmit electrodes SE1_1 to SE1_5 among the first sensor parts SSP1 may be smaller in size than a first sensor part SSP1 disposed at the center, for example, may have a size corresponding to half a size of the first sensor part SSP1 disposed at the center. Each of two second sensor parts SSP2 disposed at opposite ends of one of the receive electrodes SE2_1 to SE2_4 among the second sensor parts SSP2 may be smaller in size than a second sensor part SSP2 disposed at the center, for example, may have a size corresponding to half a size of the second sensor part SSP2 disposed at the center.

FIG. 5 illustrates the transmit electrodes SE1_1 to SE1_5 and the receive electrodes SE2_1 to SE2_4, according to an embodiment of the present disclosure. However, the shapes thereof are not limited thereto. In an embodiment of the present disclosure, the transmit electrodes SE1_1 to SE1_5 and the receive electrodes SE2_1 to SE2_4 may have a shape (e.g., a bar shape) in which a sensor part and a connection part are not distinguished from each other. It is illustrated that each of the first sensor parts SSP1 and the second sensor parts SSP2 is in the shape of a rhombus, but the present disclosure is not limited thereto. For example, the first sensor parts SSP1 and the second sensor parts SSP2 may have different polygonal shapes.

The first sensor parts SSP1 are arranged in the second direction DR2 in each of the transmit electrodes SE1_1 to SE1_5, and the second sensor parts SSP2 are arranged in the first direction DR1 in each of the receive electrodes SE2_1 to SE2_4. Each of the first connection parts CP1 connects the first sensor parts SSP1 adjacent thereto, and each of the second connection parts CP2 connects the second sensor parts SSP2 adjacent thereto.

Each of the transmit electrodes SE1_1 to SE1_5 and the receive electrodes SE2_1 to SE2_4 may have a mesh shape. As each of the transmit electrodes SE1_1 to SE1_5 and the receive electrodes SE2_1 to SE2_4 has a mesh shape, a parasitic capacitance between electrodes of the input sensor ISP and electrodes included in the display panel DP (refer to FIG. 2) may be reduced. Also, since the transmit electrodes SE1_1 to SE1_5 and the receive electrodes SE2_1 to SE2_4 do not overlap emission areas PXA (see FIG. 4), the transmit electrodes SE1_1 to SE1_5 and the receive electrodes SE2_1 to SE2_4 are not viewed by a user US of the display device DD.

The mesh-shaped transmit electrodes SE1_1 to SE1_5 and the mesh-shaped receive electrodes SE2_1 to SE2_4 may include, but is not limited to, silver (Ag), aluminum (Al), copper (Cu), chromium (Cr), nickel (Ni), titanium (Ti), etc.

The transmit signal lines SL1_1 to SL1_5 and the receive signal lines SL2_1 to SL2_4 may be disposed in the non-active area NAA.

The input sensor ISP may include input pads I_PD that extend from one ends of the transmit signal lines SL1_1 to SL1_5 and the receive signal lines SL2_1 to SL2_4 and are disposed in the non-active area NAA. The input pads I_PD may be electrically connected with the transmit signal lines SL1_1 to SL1_5 and the receive signal lines SL2_1 to SL2_4. In an embodiment of the present disclosure, the input pads I_PD may include a transmit input pad I_PD1 with which the transmit signal lines SL1_1 to SL1_5 are electrically connected and a receive input pad I_PD2 with which the receive signal lines SL2_1 to SL2_4 are electrically connected.

In an embodiment of the present disclosure, a pad area PLD in which the input pads I_PD are disposed may be included in the non-active area NAA. The input pads I_PD may be provided as some of circuit elements disposed in the circuit element layer DP-CL (refer to FIG. 3) are exposed from an intermediate insulating layer included in the circuit element layer DP-CL.

The pad area PLD may further include pixel pads D_PD for connecting the flexible circuit film FCB (refer to FIG. 2) with the display panel DP (refer to FIG. 2). The input pads I_PD and the pixel pads D_PD may be aligned in the pad area PLD located on one side.

The display device DD may further include the sensor driving part ICP that controls the driving of the input sensor ISP.

In an embodiment of the present disclosure, the sensor driving part ICP may be electrically connected with the input sensor ISP. The sensor driving part ICP may be electrically connected with the transmit signal lines SL1_1 to SL1_5 and the receive signal lines SL2_1 to SL2_4 through the input pads I_PD.

The sensor driving part ICP transmits driving control signals DCS to the transmit electrodes SE1_1 to SE1_5, and receives sensing signals RS, to which a variation in a capacitance between the transmit electrodes SE1_1 to SE1_5 and the receive electrodes SE2_1 to SE2_4 is applied, from the receive electrodes SE2_1 to SE2_4. In an embodiment of the present disclosure, the driving control signals DCS may be sensing scan signals that are sequentially transferred to the transmit electrodes SE1_1 to SE1_5.

In an embodiment of the present disclosure, the sensor driving part ICP may drive the input sensor ISP in a first manner and/or a second manner. The first manner may be the mutual-capacitive sensing manner. The second manner may be a self-capacitive sensing manner. For example, the sensor driving part ICP may transmit the driving control signal DCS, which includes a first driving signal driving an input sensor in the first manner and a second driving signal driving the input sensor in the second manner, to each of the transmit electrodes SE1_1 to SE1_5.

The sensor driving part ICP may transmit the driving control signal DCS to the input sensor ISP based on a driving frequency of the display panel DP. In an embodiment of the present disclosure, the sensor driving part ICP may not transmit the driving control signal DCS when the driving frequency of the display panel DP is a high frequency and may transmit the driving control signal DCS when the driving frequency of the display panel DP is a low frequency. This will be described in detail later.

Figure 6A:
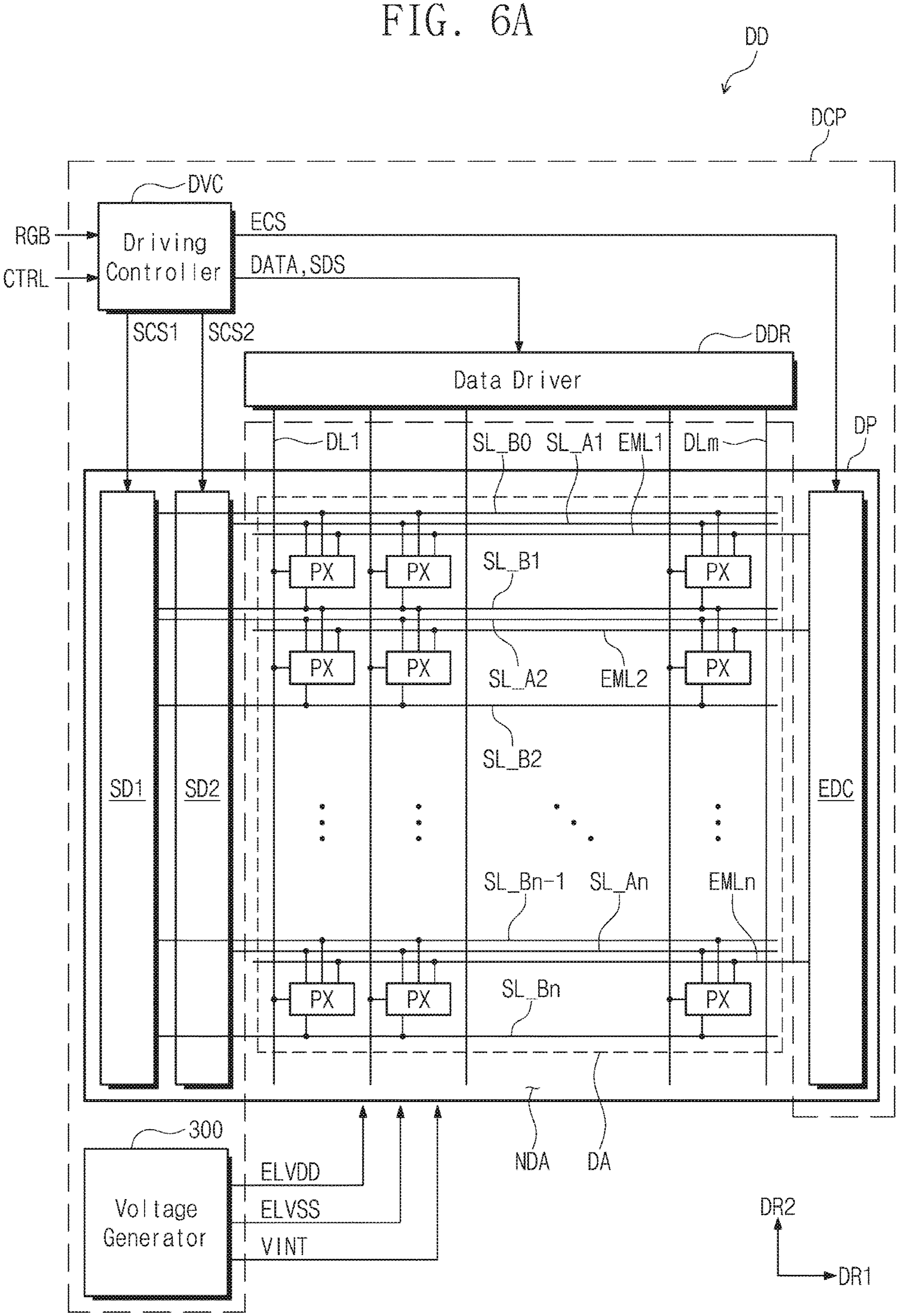
FIG. 6A is a block diagram of a display device according to an embodiment of the present disclosure.

FIG. 6A is a block diagram of a display device according to an embodiment of the present disclosure.

Referring to FIG. 6A, the display device DD includes the display panel DP and a display driving part DCP.

The display driving part DCP includes a data driver DDR, a scan driver (SD1, SD2), an emission driver EDC, a voltage generator 300, and a driving controller DVC.

The driving controller DVC receives an image signal RGB and a control signal CTRL. The driving controller DVC generates an image data signal DATA by converting a data format of the image signal RGB in compliance with the specification for an interface with the data driver DDR. The control signal CTRL may include a vertical synchronization signal Vsync (refer to FIG. 7), a horizontal synchronization signal Hsync (refer to FIG. 7), a main clock, and the like. The driving controller DVC outputs a scan control signal (SCS1, SCS2) and a data control signal SDS. The scan control signal may include a first scan control signal SCS1 and a second scan control signal SCS2. For example, the driving controller DVC may receive a vertical synchronization signal Vsync, a horizontal synchronization signal Hsync, and a clock signal, generate the first scan control signal SCS1 and the second scan control signal SCS2 for respectively controlling driving of a first scan driver SD1 and a second scan driver SD2 to be described, and transfer the relevant control signals to the relevant elements.

The data driver DDR receives the data control signal SDS and the image data signal DATA from the driving controller DVC. The data driver DDR converts the image data signal DATA into data signals and outputs the data signals to a plurality of data lines DL1 to DLm to be described later. A data signal refers to an analog voltage corresponding to a gray scale value of the image data signal DATA.

The scan driver (SD1, SD2) includes a first scan driver SD1 and a second scan driver SD2. The first scan driver SD1 receives the first scan control signal SCS1 from the driving controller DVC, and the second scan driver SD2 receives the second scan control signal SCS2 from the driving controller DVC. The first scan driver SD1 may output low-frequency scan signals in response to the first scan control signal SCS1, and the second scan driver SD2 may output high-frequency scan signals in response to the second scan control signal SCS2.

The voltage generator 300 generates voltages necessary for an operation of the display panel DP. In an embodiment of the present disclosure, the voltage generator 300 generates a first driving voltage ELVDD, the second driving voltage ELVSS, and an initialization voltage VINT.

The display panel DP includes low-frequency scan lines SL_A1 to SL_An, high-frequency scan lines SL_B0 to SL_Bn, emission control lines EML1 to EMLn, the data lines DL1 to DLm, and pixels PX. The low-frequency scan lines SL_A1 to SL_An, the high-frequency scan lines SL_B0 to SL_Bn, the emission control lines EML1 to EMLn, the data lines DL1 to DLm, and the pixels PX may be disposed in a display area DA. The low-frequency scan lines SL_A1 to SL_An, the high-frequency scan lines SL_B0 to SL_Bn, and the emission control lines EML1 to EMLn extend in the first direction DR1. The low-frequency scan lines SL_A1 to SL_An, the high-frequency scan lines SL_B0 to SL_Bn, and the emission control lines EML1 to EMLn are arranged to be spaced apart from each other in the second direction DR2. The second direction DR2 may be a direction intersecting the first direction DR1. The data lines DL1 to DLm extend in the second direction DR2 and are arranged to be spaced apart from each other in the first direction DR1.

The plurality of pixels PX are electrically connected with the low-frequency scan lines SL_A1 to SL_An, the high-frequency scan lines SL_B0 to SL_Bn, the emission control lines EML1 to EMLn, and the data lines DL1 to DLm. Each of the plurality of pixels PX may be electrically connected with three scan lines. For example, as illustrated in FIG. 6A, a first row of pixels may be connected with the first low-frequency scan line SL_A1, the dummy high-frequency scan line SL_B0, and the first high-frequency scan line SL_B1. Also, a second row of pixels may be connected with the second low-frequency scan line SL_A2, the first high-frequency scan line SL_B1, and the second high-frequency scan line SL_B2.

The first and second scan drivers SD1 and SD2 may be disposed in a non-display area NDA of the display panel DP. The first scan driver SD1 outputs low-frequency scan signals to the low-frequency scan lines SL_A1 to SL_An in response to the first scan control signal SCS1, and the second scan driver SD2 outputs high-frequency scan signals to the high-frequency scan lines SL_B0 to SL_Bn in response to the second scan control signal SCS2.

The first scan driver SD1 may drive the low-frequency scan lines SL_A1 to SL_An at a first scan frequency in response to the first scan control signal SCS1, and the second scan driver SD2 may drive the high-frequency scan lines SL_B0 to SL_Bn at a second scan frequency in response to the second scan control signal SCS2. Herein, the second scan frequency may be higher than the first scan frequency.

The emission driver EDC receives an emission driving signal ECS from the driving controller DVC. The emission driver EDC may output emission control signals to the emission control lines EML1 to EMLn in response to the emission driving signal ECS.

The emission driver EDC may be disposed in the non-display area NDA of the display panel DP. In an embodiment of the present disclosure, the first and second scan drivers SD1 and SD2 may be disposed adjacent to a first side of the display area DA, and the emission driver EDC may be disposed adjacent to a second side of the display area DA. In other words, the display area DA may be provided between the first and second scan drivers SD1 and SD2 and the emission driver EDC. However, the present disclosure is not limited thereto. For example, the emission driver EDC may be disposed adjacent to the first side of the display area DA together with the first and second scan drivers SD1 and SD2. Alternatively, the first scan driver SD1 may be disposed adjacent to the first side of the display area DA, and the second scan driver SD2 and the emission driver EDC may be disposed adjacent to the second side of the display area DA.

Each of the plurality of pixels PX includes a light-emitting element ED (refer to FIG. 6B) and a pixel circuit part PXC (refer to FIG. 6B) controlling the emission of the light-emitting element ED. Each of the pixels PX may display, for example, red, green, blue, or white light. In an embodiment of the present disclosure, the plurality of pixels PX may be arranged in a matrix shape, but the present disclosure is not limited thereto. For example, the plurality of pixels PX may be arranged in a pentile matrix shape, or a diamond shape. The pixel circuit part PXC may include a plurality of transistors and a capacitor. At least one of the first and second scan drivers SD1 and SD2 or the emission driver EDC may include transistors that are formed through the same process as the pixel circuit part PXC.

Each of the plurality of pixels PX may receive the first driving voltage ELVDD, the second driving voltage ELVSS, and the initialization voltage VINT from the voltage generator 300.

Figure 6B:
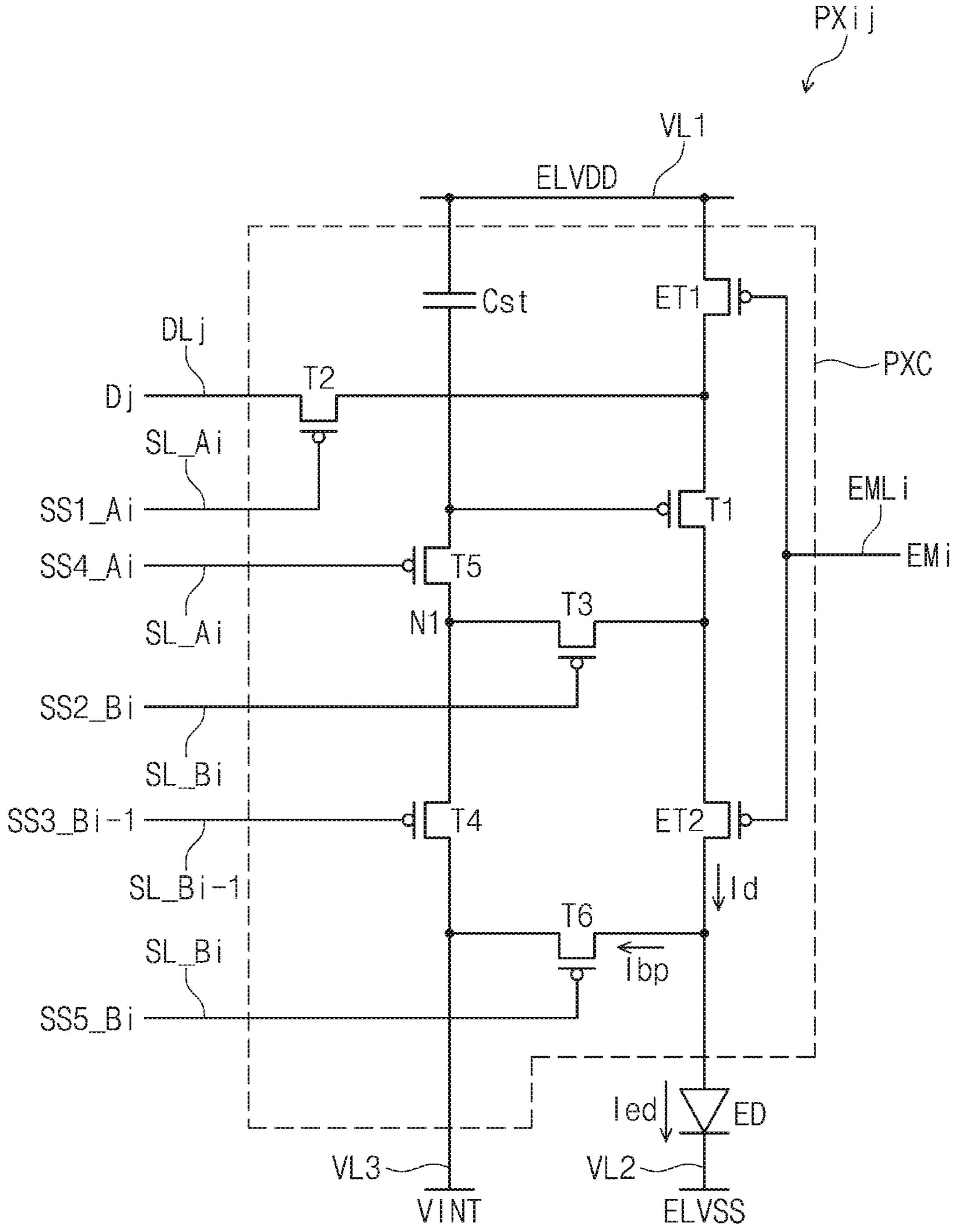
FIG. 6B is a circuit diagram of a pixel according to an embodiment of the present disclosure.

FIG. 6B is a circuit diagram of a pixel according to an embodiment of the present disclosure.

An equivalent circuit diagram of one pixel PXij among the plurality of pixels PX illustrated in FIG. 6A is illustrated in FIG. 6B as an example. Below, a circuit structure of the pixel PXij will be described. The plurality of pixels PX have the same structure, and thus, additional description associated with the remaining pixels will be omitted to avoid redundancy.

Referring to FIG. 6B, the pixel PXij is connected with a j-th data line DLj (hereinafter referred to as a "current data line") of the data lines DL1 to DLm, an i-th low-frequency scan line SL_Ai (hereinafter referred to as a "current low-frequency scan line") of the low-frequency scan lines SL_A1 to SL_An, an (i−1)-th high-frequency scan line SL_Bi−1 (hereinafter referred to as a "previous high-frequency scan line") of the high-frequency scan lines SL_B0 to SL_Bn, an i-th high-frequency scan line SL_Bi (hereinafter referred to as a "current high-frequency scan line") of the high-frequency scan lines SL_B0 to SL_Bn, and an i-th emission control line EMLi (hereinafter referred to as a "current emission control line") of the emission control lines EML1 to EMLn.

The pixel PXij includes the light-emitting element ED and the pixel circuit part PXC. The pixel circuit part PXC includes first to sixth transistors T1, T2, T3, T4, T5, and T6, first and second emission control transistors ET1 and ET2, and a capacitor Cst. Each of the first to sixth transistors T1, T2, T3, T4, T5, and T6 and the first and second emission control transistors ET1 and ET2 may be a transistor having a low-temperature polycrystalline silicon (LTPS) semiconductor layer. The first to sixth transistors T1 to T6 may be implemented with transistors of the same type. In an embodiment of the present disclosure, each of the first to sixth transistors T1 to T6 may be a P-type transistor, and each of the first and second emission control transistors ET1 and ET2 may also be a P-type transistor. A configuration of the pixel circuit part PXC according to the present disclosure is not limited to the embodiment illustrated in FIG. 6B. The pixel circuit part PXC illustrated in FIG. 6B is only one example, and the configuration of the pixel circuit part PXC may be modified and carried out. For example, each of the first to sixth transistors T1 to T6 may be an N-type transistor, and each of the first and second emission control transistors ET1 and ET2 may also be an N-type transistor. For example, the number of transistors and the number of capacitors may be changed in various ways according to a design of the pixel circuit part PXC. For example, the pixel circuit part PXC may include two, three, four, five, six, seven or more than eight transistors instead of the above described eight transistors, and may include two or more capacitors instead of the above described one capacitor.

The first transistor T1 includes a first electrode connected with a first voltage line VL1 through the first emission control transistor ET1, a second electrode electrically connected with an anode of the light-emitting element ED through the second emission control transistor ET2, and a third electrode connected with a first end of the capacitor Cst. The first voltage line VL1 may transfer the first driving voltage ELVDD to the pixel PXij. The first transistor T1 may be supplied with a data signal Dj, which the current data line DLj transfers, depending on a switching operation of the second transistor T2 and may supply a driving current Id to the light-emitting element ED. The light-emitting element ED may emit light having a certain luminance according to the driving current Id.

The second transistor T2 includes a first electrode connected with the current data line DLj, a second electrode connected with the first electrode of the first transistor T1, and a third electrode receiving a first scan signal SS1_Ai. The third electrode of the second transistor T2 may be electrically connected with the current low-frequency scan line SL_Ai. Accordingly, the second transistor T2 may receive an i-th low-frequency scan signal transferred through the current low-frequency scan line SL_Ai as the first scan signal SS1_Ai. The second transistor T2 may be turned on depending on the first scan signal SS1_Ai to transfer the data signal Dj transferred through the current data line DLj to the first electrode of the first transistor T1.

The third transistor T3 includes a first electrode connected with a first node N1, a second electrode connected with the second electrode of the first transistor T1, and a third electrode receiving a second scan signal SS2_Bi. The third electrode of the third transistor T3 may be electrically connected with the current high-frequency scan line SL_Bi. Accordingly, the third transistor T3 may receive an i-th high-frequency scan signal transferred through the current high-frequency scan line SL_Bi as the second scan signal SS2_Bi. The third transistor T3 may be turned on depending on the second scan signal SS2_Bi to electrically connect the first node N1 and the second electrode of the first transistor T1.

The fourth transistor T4 includes a first electrode connected with the first node N1, a second electrode connected with a third voltage line VL3, and a third electrode receiving a third scan signal SS3_Bi−1. The third voltage line VL3 may transfer the initialization voltage VINT to the pixel PXij. The third electrode of the fourth transistor T4 may be electrically connected with the previous high-frequency scan line SL_Bi−1. Accordingly, the fourth transistor T4 may receive an (i−1)-th high-frequency scan signal transferred through the previous high-frequency scan line SL_Bi−1 as the third scan signal SS3_Bi−1. The fourth transistor T4 may be turned on depending on the third scan signal SS3_Bi−1 to transfer the initialization voltage VINT to the first node N1. In this case, the first node N1 may be initialized, that is, an initialization operation for the first node N1 may be performed.

In an embodiment of the present disclosure, the third transistor T3 and the fourth transistor T4 may each be configured to have a dual gate structure to cut off a leakage current. However, the present disclosure is not limited thereto.

The fifth transistor T5 includes a first electrode connected with the third electrode of the first transistor T1, a second electrode connected with the first node N1, and a third electrode receiving a fourth scan signal SS4_Ai. The third electrode of the fifth transistor T5 may be electrically connected with the current low-frequency scan line SL_Ai. Accordingly, the fifth transistor T5 may receive the i-th low-frequency scan signal transferred through the current low-frequency scan line SL_Ai as the fourth scan signal SS4_Ai. The fifth transistor T5 may be turned on depending on the fourth scan signal SS4_Ai to electrically connect the first node N1 and the third electrode of the first transistor T1.

The first end of the capacitor Cst is connected with the third electrode of the first transistor T1, and a second end thereof is connected with the first voltage line VL1. For example, the first transistor T1 is connected to the first voltage line VL1 and the capacitor Cst, and may be configured to control the driving current Id flowing through the light-emitting element ED from the first voltage line VL1, in response to the voltage stored in the capacitor Cst. The light-emitting element ED may be configured to emit light having a predetermined brightness according to the driving current Id. The turn-on time of the first transistor T1 may be determined according to the amount of voltage or charge stored in the capacitor Cst. The first transistor T1 may then provide to the light-emitting element ED the first driving voltage ELVDD transmitted through the first voltage line VL1 during the turn-on time.

The first emission control transistor ET1 includes a first electrode connected with the first voltage line VL1, a second electrode connected with the first electrode of the first transistor T1, and a third electrode connected with the current emission control line EMLi.

The second emission control transistor ET2 includes a first electrode connected with the second electrode of the first transistor T1, a second electrode connected with the anode of the light-emitting element ED, and a third electrode connected with the current emission control line EMLi.

The first and second emission control transistors ET1 and ET2 are simultaneously turned on depending on an emission control signal EMi transferred through the current emission control line EMLi. The first driving voltage ELVDD applied through the first emission control transistor ET1 turned on may be transferred to the light-emitting element ED through the first transistor T1 and the second emission control transistor ET2 turned on.

The sixth transistor T6 includes a first electrode connected with the second electrode of the fourth transistor T4, a second electrode connected with the second electrode of the second emission control transistor ET2, and a third electrode receiving a fifth scan signal SS5_Bi. The third electrode of the sixth transistor T6 may be electrically connected with the current high-frequency scan line SL_Bi. Accordingly, the sixth transistor T6 may receive the i-th high-frequency scan signal transferred from the current high-frequency scan line SL_Bi as the fifth scan signal SS5_Bi. When the sixth transistor T6 is turned on by the fifth scan signal SS5_Bi, the anode of the light-emitting element ED may be initialized to the initialization voltage VINT, that is, an initialization operation for the anode of the light-emitting element ED may be performed. When the sixth transistor T6 is in the turned off state, a part of the driving current Id may be discharged through the sixth transistor T6 as the bypass current Ibp. Thus, the emission current Ied of the light-emitting element ED may be reduced by the amount of the bypass current Ibp that has escaped from the driving current Id through the sixth transistor T6.

The anode of the light-emitting element ED may be connected with the second electrode of the second emission control transistor ET2 and the second electrode of the sixth transistor T6, and a cathode of the light-emitting element ED may be connected with the second voltage line VL2. The second voltage line VL2 may transfer the second driving voltage ELVSS to the pixel PXij.

The first and fourth scan signals SS1_Ai and SS4_Ai may be low-frequency scan signals output from the first scan driver SD1 operating at the first scan frequency, and the second, third, and fifth scan signals SS2_Bi, SS3_Bi−1, and SS5_Bi may be high-frequency scan signals output from the second scan driver SD2 operating at the second scan frequency. In an embodiment of the present disclosure, each of the first and fourth scan signals SS1_Ai and SS4_Ai may be the i-the low-frequency scan signal supplied from the current low-frequency scan line SL_Ai. Each of the second and fifth scan signals SS2_Bi and SS5_Bi may be the i-th high-frequency scan signal supplied from the current high-frequency scan line SL_Bi. However, the present disclosure is not limited thereto. For example, the first and fourth scan signals SS1_Ai and SS4_Ai may be signals that are supplied from different low-frequency scan lines, and the second and fifth scan signals SS2_Bi and SS5_Bi may be signals that are supplied from different high-frequency scan lines.

Figure 7:
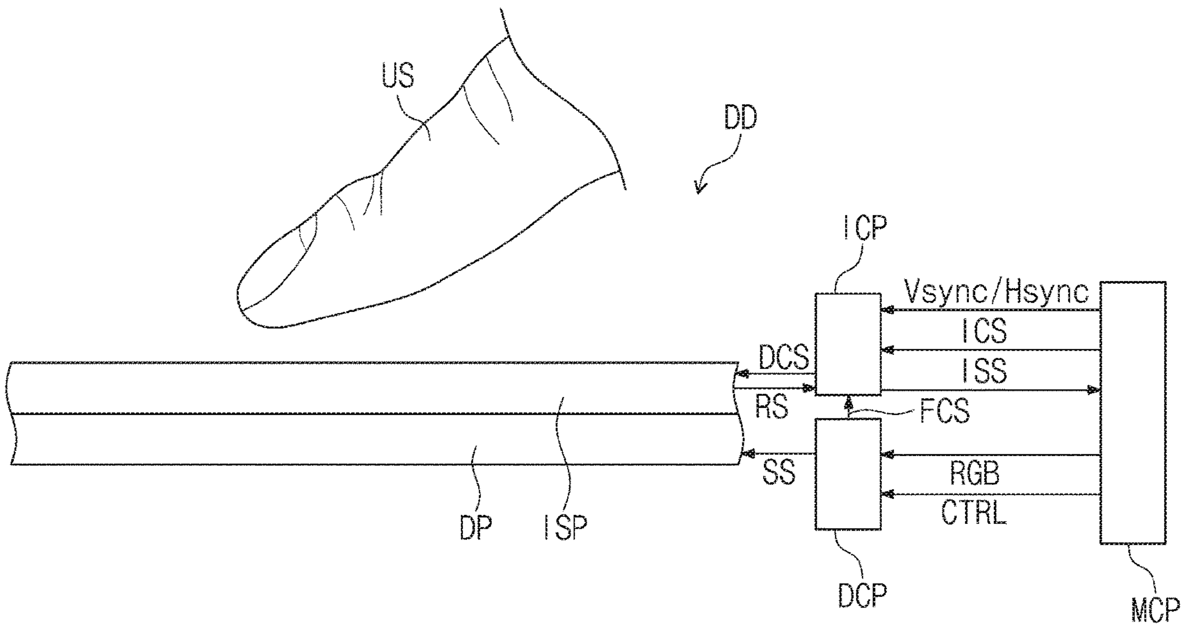
FIG. 7 is a block diagram illustrating a display device according to an embodiment of the present disclosure.

FIG. 7 is a block diagram illustrating a display device according to an embodiment of the present disclosure.

Referring to FIG. 7, the display device DD may include the display panel DP, the input sensor ISP, the main driving part MCP, the display driving part DCP, and the sensor driving part ICP.

The input sensor ISP may be disposed on the display panel DP to sense an external input. The input sensor ISP may sense the external input TC (refer to FIG. 1) by a body of the user US. For example, the input TC may be the user's hand applied to the front surface of the display device DD.

The main driving part MCP may control an overall operation of the display device DD, and may serve as a central processing unit (CPU) of the display device DD. In an embodiment of the present disclosure, the main driving part MCP may control operations of the display driving part DCP and the sensor driving part ICP. The main driving part MCP may be disposed on the main circuit board MCB (refer to FIG. 2).

The display driving part DCP may receive the image signal RGB and the control signal CTRL from the main driving part MCP. The control signal CTRL may include various signals. For example, the control signal CTRL may include the horizontal synchronization signal Hsync, the vertical synchronization signal Vsync, a main clock, a data enable signal, and the like.

The display driving part DCP may generate display signals SS for driving the display panel DP based on the image signal RGB and the control signal CTRL provided by the main driving part MCP. In an embodiment of the present disclosure, the display signals SS may include a data signal and scan signals.

The sensor driving part ICP may control the input sensor ISP. The sensor driving part ICP may receive a sensing control signal ICS, the vertical synchronization signal Vsync, and the horizontal synchronization signal Hsync. The sensor driving part ICP may receive information FCS about a driving frequency of a display panel from the display driving part DCP.

The sensing control signal ICS may include a sensing clock signal, a signal including information about a relationship between a sensing frequency of the input sensor ISP and a driving frequency of the display panel DP, and the like.

The sensor driving part ICP may generate the driving control signal DCS for driving the input sensor ISP based on the sensing control signal ICS, the vertical synchronization signal Vsync, and the horizontal synchronization signal Hsync. The sensor driving part ICP may control the output of the driving control signal DCS based on information FCS about the driving frequency of the display panel DP.

The sensor driving part ICP may calculate coordinate information of the external input TC (refer to FIG. 1) based on sensing signals RS from the input sensor ISP and may provide a coordinate signal ISS including the coordinate information to the main driving part MCP. The main driving part MCP makes it possible to perform an operation corresponding to the external input TC of the user US based on the coordinate signal ISS. For example, the main driving part MCP may allow the display driving part DCP to operate based on the coordinate signal ISS, such that a new image is displayed on the display panel DP.

Figure 8:
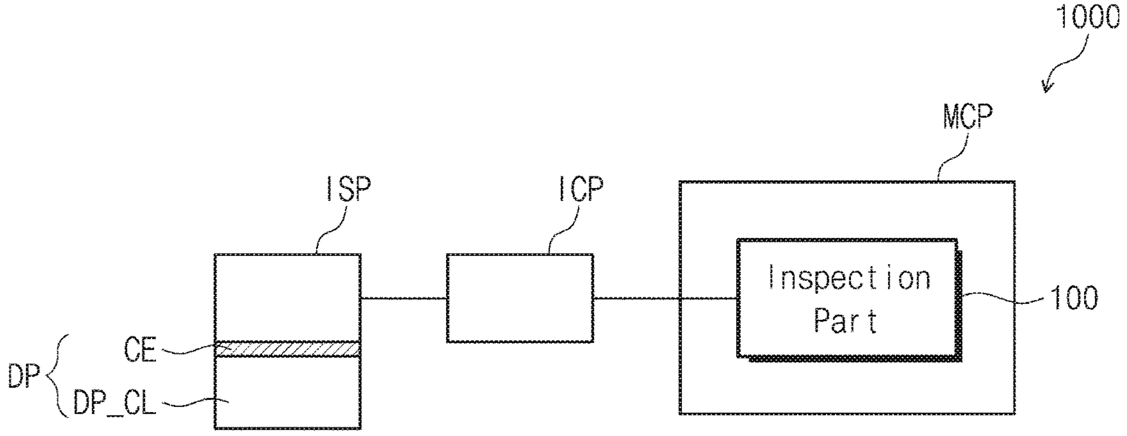
FIG. 8 is a block diagram illustrating a defect inspection apparatus of a display panel according to an embodiment of the present disclosure.

FIG. 8 is a block diagram illustrating a defect inspection apparatus of a display panel according to an embodiment of the present disclosure.

Referring to FIG. 8, a defect inspection apparatus 1000 of a display panel may include the display panel DP, the input sensor ISP, the sensor driving part ICP, and an inspection part 100. Additional description associated with the display panel DP, the input sensor ISP, and the sensor driving part ICP will be omitted to avoid redundancy.

The main driving part MCP may drive the input sensor ISP in a sensing mode or an inspection mode through the sensor driving part ICP. The input sensor ISP may be normally driven in the sensing mode and may sense an external input such as a touch of a user. The input sensor ISP may inspect a defect of a display panel in the inspection mode. In an embodiment of the present disclosure, the input sensor ISP may be driven at different frequencies in the inspection mode and the sensing mode.

The inspection part 100 may be included in the main driving part MCP. The inspection part 100 may be included in the main driving part MCP and may be connected with the sensor driving part ICP.

The inspection part 100 may be electrically connected with the sensor driving part ICP and the input sensor ISP and may detect a jitter change of the input sensor ISP. In this embodiment, the inspection part 100 may detect the jitter change of the input sensor ISP in the inspection mode and may inspect whether a defect (e.g., a deposition defect) of the display panel DP is disposed under the input sensor ISP, based on a detection result.

Herein, the jitter may correspond to "differences of an unstable signal", which occur between a desired signal and an actually generated signal with regard to a specific signal. The jitter may include a phenomenon in which a digital pulse signal waveform is distorted on a time axis. That is, the jitter refers to a signal difference that appears during a short time with respect to an ideal position in time, and is one of important quality indices of a reproduced signal. As a change level of the jitter becomes greater, the probability that the quality is abnormal may be determined as becoming higher. On the other hand, as the change level of the jitter becomes smaller, the probability that the quality is normal may be determined as becoming higher.

In the case where a variation in a jitter occurring at a specific channel or sensing electrode of the input sensor ISP is relatively great, it may occur due to a shadow phenomenon according to a defect of the display panel DP adjacent to the corresponding sensing electrode. For example, in the case where the display panel DP is not shielded from the input sensor ISP due to the defect of the display panel DP, a noise may occur in the input sensor ISP due to the influence of the display panel DP. In this case, a change in the jitter of the input sensor ISP, which is measured by the inspection part 100, may increase.

As described above, the sensor driving part ICP may set a driving frequency when the input sensor ISP is normally driven. In an embodiment of the present disclosure, the inspection part 100 may be electrically connected with the sensor driving part ICP and may set an inspection frequency in the inspection mode of the input sensor ISP through the sensor driving part ICP.

The inspection part 100 may inspect a defect of the display panel DP through a change in the jitter that appears when the input sensor ISP is driven at the set inspection frequency in the inspection mode. In this embodiment, the inspection frequency may include a harmonic frequency of a driving frequency of a display panel.

Herein, the harmonics may be multiples of the fundamental frequency. For example, when the fundamental frequency is 1.2 GHz, the higher harmonics may be 2.4 GHz, 3.6 GHz, 4.8 GHz, and so on. That is, the harmonics of a frequency of a display panel may include multiples of the driving frequency of the display panel.

In an embodiment of the present disclosure, the inspection part 100 may detect a deposition defect of the second electrode CE of the display panel DP. In the case where a hole is present in the second electrode CE due to the deposition defect of the second electrode CE, a noise may occur in the input sensor ISP due to insufficient shielding.

The inspection part 100 may detect a jitter change of the input sensor ISP made by the noise coming from the deposition defect of the second electrode CE, may determine whether the deposition defect occurs in the second electrode CE based on a result of the detection, and may detect a location of the deposition defect. In detail, in the inspection mode where the input sensor ISP is driven at the inspection frequency, the inspection part 100 may detect a specific sensing electrode at which a jitter level is higher than a reference level and may detect a deposition defect with respect to a specific portion of the second electrode CE disposed physically adjacent to the specific sensing electrode thus detected. For example, the specific sensing electrode of the input sensor ISP having the higher jitter level may overlap the deposition defect of the second electrode CE of the display panel DP.

Figure 9:
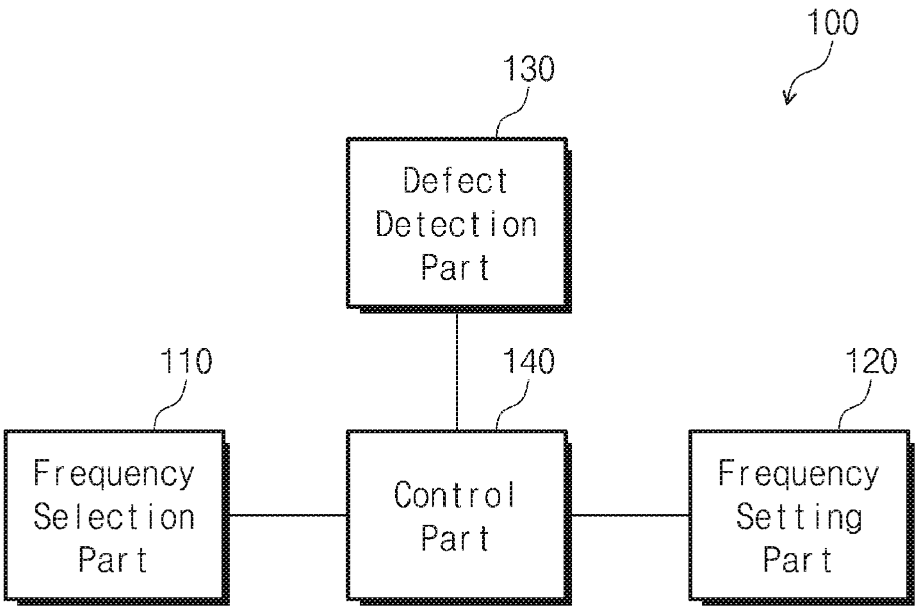
FIG. 9 is a block diagram of an inspection part according to an embodiment of the present disclosure.

FIG. 9 is a block diagram of an inspection part according to an embodiment of the present disclosure.

Referring to FIG. 9, the inspection part 100 may include a frequency selection part 110, a frequency setting part 120, and a defect detection part 130.

The frequency selection part 110 may select an inspection frequency of the input sensor ISP, and may store the selected inspection frequency. The frequency selection part 110 may select a frequency, which allows a magnitude of a change in the jitter of the input sensor ISP to increase, as the inspection frequency. The frequency selection part 110 may select a harmonic of a frequency of the display panel DP as the inspection frequency. The inspection frequency may be provided in plurality. For example, the frequency selection part 110 may be connected to the sensor driving part ICP to drive the input sensor ISP at a plurality of frequencies of a given range, with the display panel DP being driven.

In an embodiment of the present disclosure, the frequency selection part 110 may select a value, which is obtained by multiplying the number of scan lines of the display panel DP and a refresh rate of a screen together, as the inspection frequency. For example, in the 2400×1080 resolution, in the case where the number of scan lines is 2400 and a refresh rate is 120 Hz, a frequency of about 288 KHz may be selected as the inspection frequency. Herein, the refresh rate may correspond to a frame rate.

In an embodiment of the present disclosure, the frequency selection part 110 may select frequencies, at which a magnitude of a level change of the jitter is a specific reference or more, from among a plurality of arbitrary frequencies as the inspection frequency. The frequency selection part 110 may select frequencies, at which a level of the jitter is relatively great due to the harmonics of the frequency of the display panel DP, from among the plurality of arbitrary frequencies as the inspection frequency. For example, in a frequency range from 225 KHz to 270 HKz, when jitter levels at 226.5 KHz and 230 KHz are higher than jitter levels at the remaining frequencies, frequencies of 226.5 KHz and 230 KHz may correspond to the harmonics of the frequency of the display panel DP, and the frequency selection part 110 may select the frequencies 226.5 KHz and 230 KHz from a plurality of frequencies belonging to a range from 225 KHz to 270 KHz as the inspection frequency.

In an embodiment of the present disclosure, the frequency selection part 110 may select a frequency, for example, through a calculation, from the driving frequency of the display panel DP through the fast Fourier transform, with the display panel DP driven and the input sensor ISP not driven. The selected frequency may correspond to a harmonic of the driving frequency of the display panel DP. The frequency selection part 110 may select the calculated frequency as the inspection frequency.

The frequency selection part 110 may store selected frequencies in a memory. The memory may be included in the main driving part MCP or the inspection part 100. Alternatively, the frequency selection part 110 may store the selected frequency in the sensor driving part ICP.

The frequency setting part 120 may fetch the frequency selected by the frequency selection part 110 in the inspection mode and may set the fetched frequency to the inspection frequency. In the case where the input sensor ISP switches from the sensing mode to the inspection mode, the frequency setting part 120 may set the inspection frequency for driving the input sensor ISP in the inspection mode. In detail, the frequency setting part 120 may be electrically connected with the sensor driving part ICP and may set a frequency of the input sensor ISP to the inspection frequency through the sensor driving part ICP.

The defect detection part 130 may detect a defect of a specific portion of a display panel, which is adjacent to a specific sensing electrode detected at the set inspection frequency. That is, the defect detection part 130 may detect the defect of the display panel DP.

In an embodiment of the present disclosure, in the inspection mode, the defect detection part 130 may extract specific sensing electrodes, at which a jitter level is higher than a reference level, from among the plurality of sensing electrodes SE1_1 to SE1_5 and SE2_1 to SE2_4 (refer to FIG. 5) of the input sensor ISP. Herein, the reference level may correspond to a level that is in advance set depending on a driving frequency of a display panel. The defect detection part 130 may determine specific portions of the display panel DP, which overlap the extracted sensing electrodes, as the defect. For example, the defect detection part 130 may detect the deposition defect with respect to specific portions of the second electrodes CE (refer to FIG. 4), which overlap the specific sensing electrodes. For example, in the process of inspecting the defect of the display panel DP, the defect detection part 130 may detect a deposition defect of the power electrode disposed between a light-emitting layer EL and the encapsulation layer TFE included in the display panel DP.

A control part 140 may perform the signal transfer between the frequency selection part 110, the frequency setting part 120, and the defect detection part 130 and may control the frequency selection part 110, the frequency setting part 120, and the defect detection part 130.

Figure 10A:
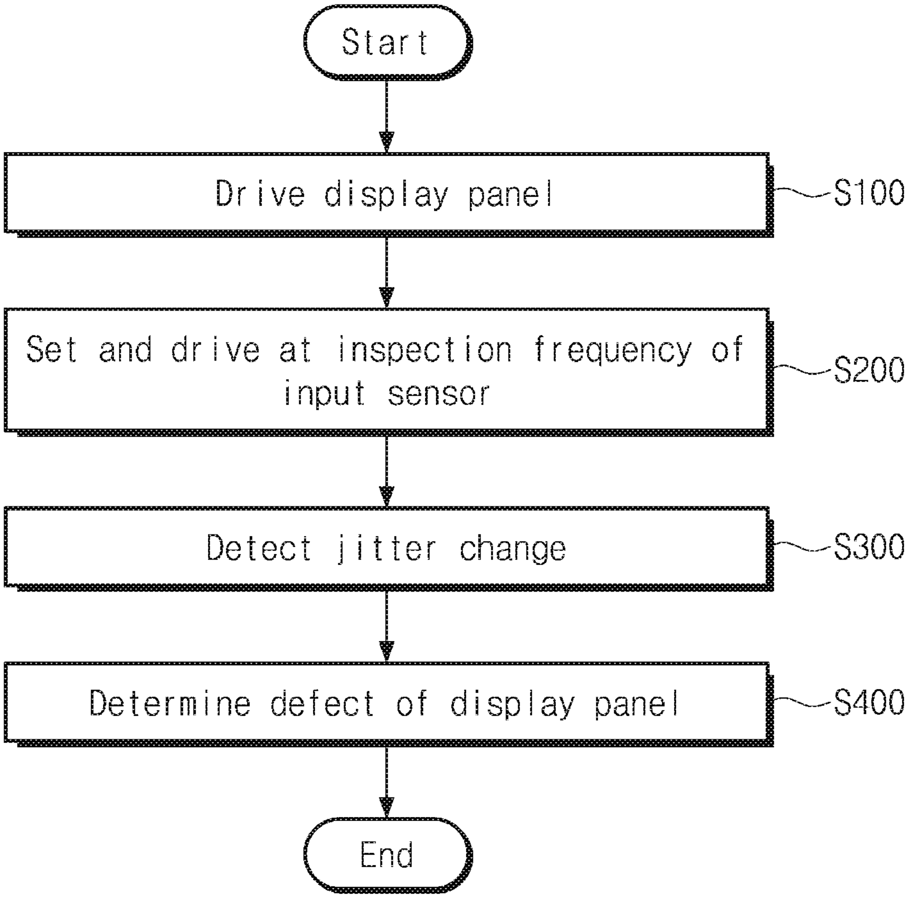
FIGS. 10A and 10B are flowcharts illustrating a method for inspecting a defect of a display panel, according to an embodiment of the present disclosure.
Figure 10B:
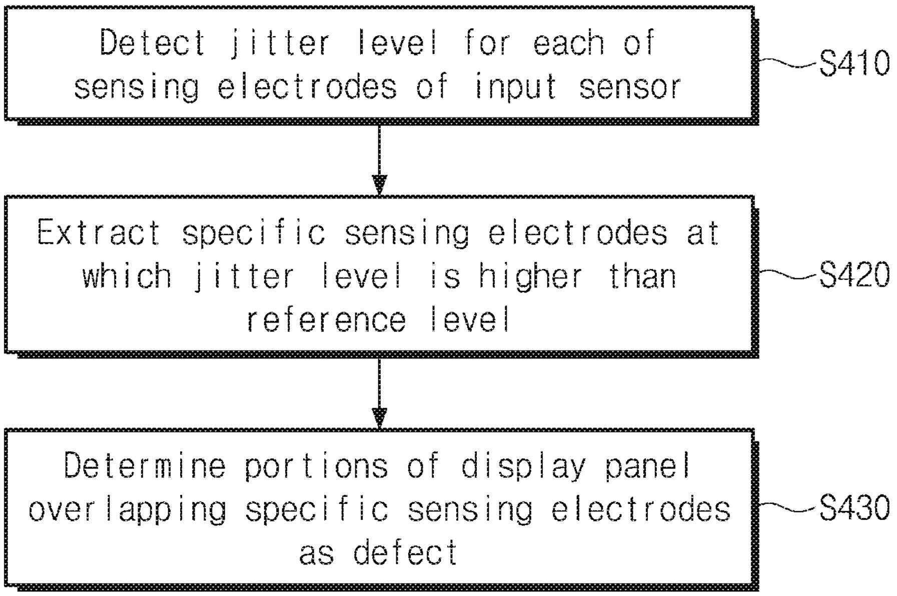

FIGS. 10A and 10B are flowcharts illustrating a method for inspecting a defect of a display panel, according to an embodiment of the present disclosure. FIG. 10A illustrates a method for inspecting a defect of a display panel. FIG. 10B illustrates a display panel defect determining method in FIG. 10A in detail, according to an embodiment of the present disclosure.

In FIG. 10A, the display panel defect inspecting method (hereinafter referred to as a "defect inspecting method") may include driving a display panel (S100). The display panel may be driven at a driving frequency.

The defect inspecting method may include setting an inspection frequency of an input sensor and driving the input sensor (S200) at the inspection frequency. The inspection frequency of the input sensor may include the harmonic of the driving frequency of the display panel. The input sensor may be driven at the inspection mode in which the input sensor is driven at the inspection frequency. The harmonic may not be used in the sensing mode of the input sensor.

The defect inspecting method may include detecting a change in the jitter of the input sensor (S300). A level change of the jitter for the plurality of sensing electrodes of the input sensor may increase in the inspection frequency. That is, a jitter level of the input sensor when the input sensor is driven at the inspection frequency may have a significant difference at a portion of the display panel, at which a defect occurs. For example, the inspection part 100 may be connected with the sensor driving part ICP, and configured to set a frequency of the input sensor ISP to an inspection frequency and to detect the defect of the display panel based on a change in a jitter occurring when the input sensor ISP is driven at the inspection frequency. In operation S300 in which the jitter change is detected, a sensing electrode at which a jitter level is relatively high may be distinguished from a sensing electrode at which a jitter level is not relatively high.

The defect inspecting method may include determining a defect of the display panel based on the jitter change (S400). The portion of the display panel, at which the defect occurs, may correspond to a portion of the display panel overlapping a sensing electrode, at which a jitter level is relatively high, from among sensing electrodes of the input sensor. In detail, it may be determined that a defect occurs at a specific portion of the display panel overlapping a specific sensing electrode, at which a jitter level is relatively high, from among the sensing electrodes.

In FIG. 10B, the determining of the defect of the display panel (S400, refer to FIG. 10A) may include detecting a jitter level for each of the plurality of sensing electrodes of the input sensor (S410). When the jitter level is detected for each of the plurality of sensing electrodes, the detected jitter level may be extracted in operation S400 of determining the defect of the display panel.

The determining of the defect of the display panel may include extracting a specific sensing electrode including a jitter level higher than the reference level from among extracted jitter levels (S420). The specific sensing electrode including the jitter level higher than the reference level may include at least one sensing electrode or a plurality of sensing electrodes. The number of specific sensing electrodes may indicate the number of portions of the display panel, at which a defect occurs.

The determining of the defect of the display panel may include determining a specific portion of the display panel overlapping the extracted sensing electrode as a defect (S430).

The defect inspecting method may include inspecting the defect of the display panel based on the jitter level of the input sensor. That is, according to the defect inspecting method, when there is detected at least one specific sensing electrode having a specific jitter level exceeding the reference level, a specific portion of the display panel, which overlaps the specific sensing electrode, may be determined as a defect.

Figure 11A:
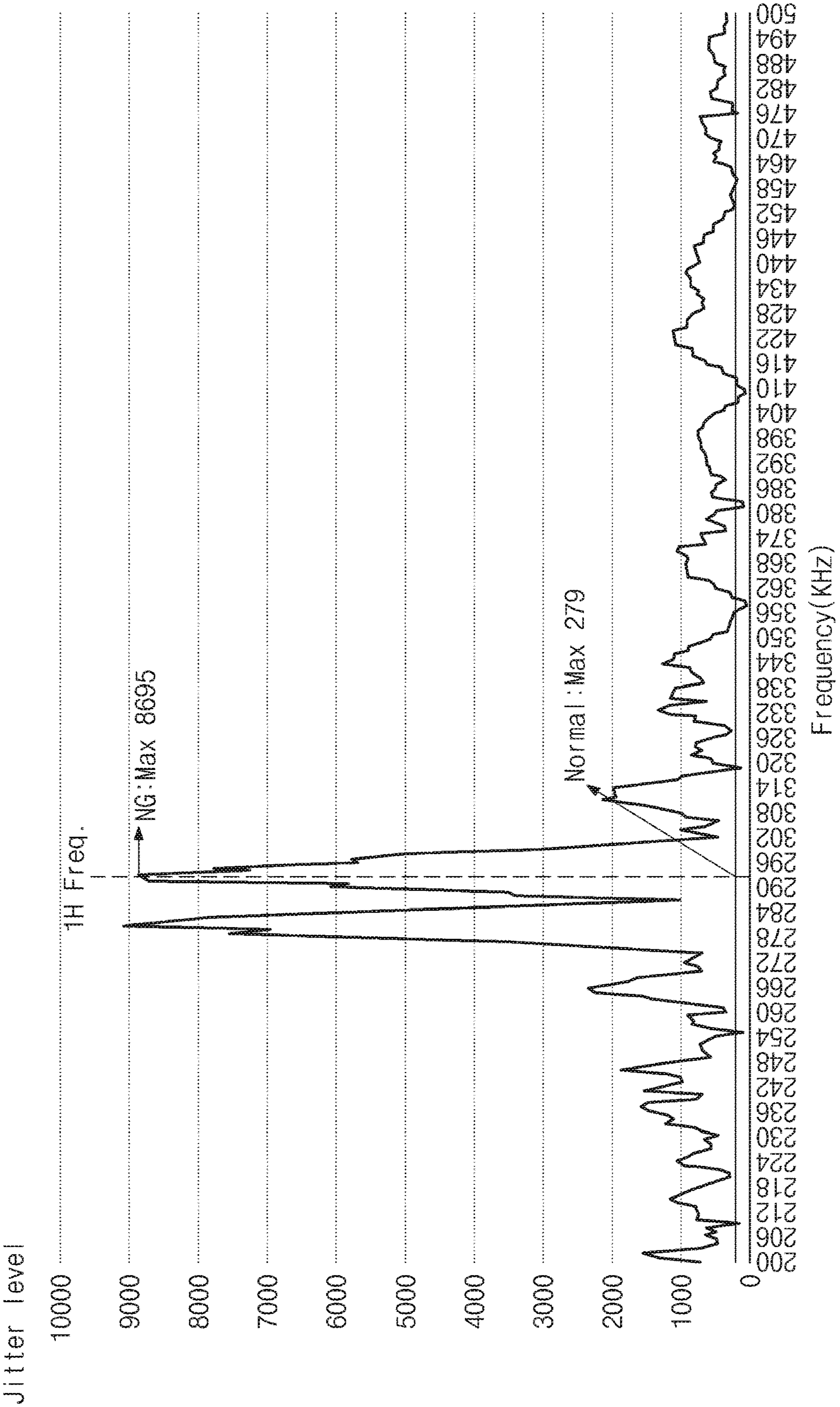

FIGS. 11A and 11B are a graph and a table illustrating a change in a jitter level according to an embodiment of the present disclosure.

FIG. 11A is a graph illustrating a relationship between a frequency and a jitter level of an input sensor according to an embodiment of the present disclosure. FIG. 11B is a table illustrating a jitter level for each of a plurality of sensing electrodes of an input sensor.

FIG. 11A shows how jitter levels change depending on a plurality of frequencies. In FIG. 11A, a reference level is illustrated to be "279". That is, the inspection part 100 (refer to FIG. 8) may detect a sensing electrode of an input sensor, the jitter level of which exceeds the reference level, that is, "279". In this case, most frequencies from 200 KHz to 500 KHz may be selected as the inspection frequency. The inspection frequency may include a frequency causing an increase in a jitter frequency at which a jitter level exceeding the reference level appears clearly. That is, the inspection frequency may correspond to the harmonics of the frequency of the display panel.

When a frequency belongs to a range from 290 KHz to 296 KHz, a maximum jitter level is "8695". That is, when a frequency belongs to a range from 290 KHz to 296 KHz, the jitter level may exceed "279" being the reference level, and thus, the inspection frequency may be the frequency belonging to the range from 290 KHz to 296 KHz.

Except for some frequencies at which the jitter level is less than "279", most frequencies from 200 KHz to 500 KHz may be selected as the inspection frequency. For example, all of a plurality of frequencies including about 215 KHz, about 224 KHz, about 338 KHz, about 370 KHz, about 422 KHz, and about 440 KHz at which the jitter level is about "1000" may exceed the reference level and may be selected as the inspection frequency.

In FIG. 11A, when a sensing electrode has a jitter level being equal to or less than the reference level, the inspection part 100 may determine the sensing electrode as corresponding to "normal". When a sensing electrode has a jitter level exceeding the reference level, the inspection part 100 may determine the sensing electrode as corresponding to "NG". A sensing electrode having a normal jitter level may be determined to be a normal sensing electrode, and a sensing electrode having an NG jitter level may be determined to be an NG sensing electrode.

FIG. 11B is a table illustrating sensing electrodes corresponding to normal "NOR" and sensing electrodes corresponding to "NG". In FIG. 11B, Tx0 to Tx15 may be transmit electrodes SE1 (refer to FIG. 5), and Rx25 to Rx35 may be receive electrodes SE2 (refer to FIG. 5). That is, the receive electrodes Rx34 and Rx35, at which a jitter level exceeds the reference level, from among the receive electrodes Rx25 to Rx35 correspond to "NG". That is, the sensing electrodes (i.e., receive electrodes) Rx34 and Rx35 may correspond to an NG sensing electrode. The sensing electrodes Rx 25 to Rx33 may correspond to a normal sensing electrode.

In an embodiment of the present disclosure, the display panel DP (refer to FIG. 7) may be disposed under the input sensor ISP (refer to FIG. 7). A specific portion of the display panel DP, which overlaps the NG sensing electrodes Rx34 and Rx35 of the sensing electrodes Rx25 to Rx35 of the input sensor ISP, may be determined to be a defect. That is, the inspection part 100 may detect a portion of a display panel overlapping an NG sensing electrode, as a defect.

Figure 12:
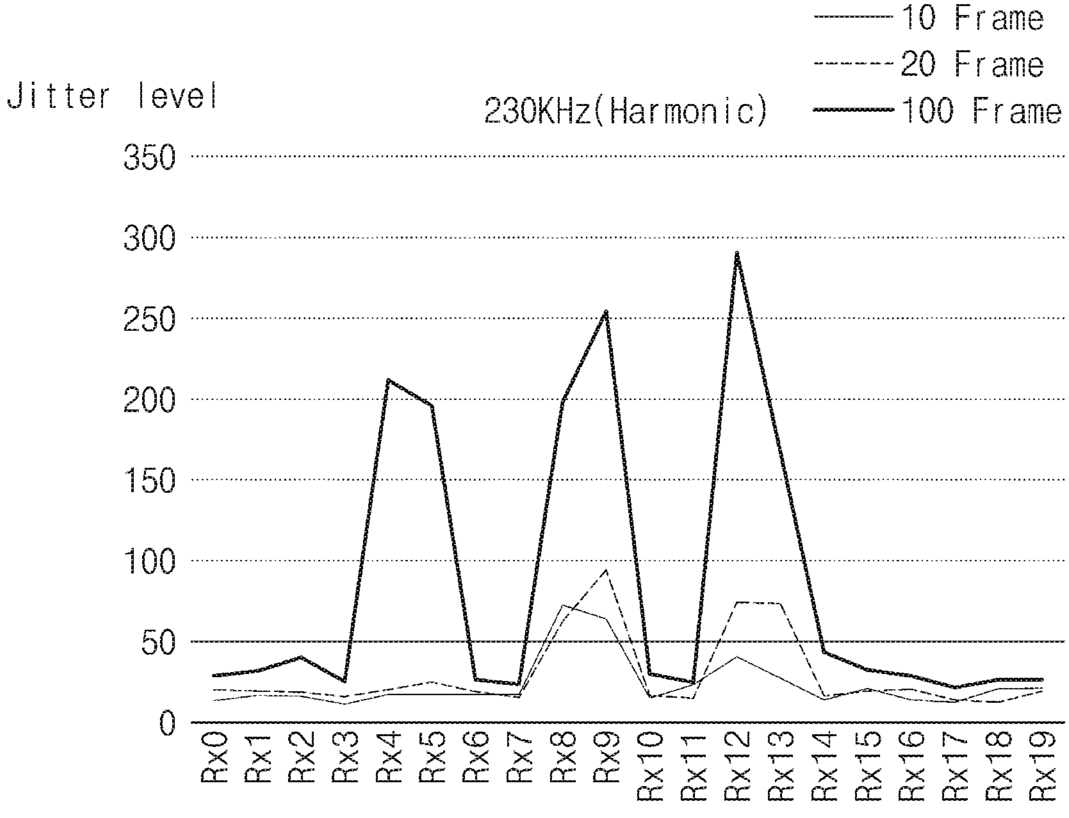
FIG. 12 is a graph illustrating a change in a jitter level according to an embodiment of the present disclosure.

FIG. 12 is a graph illustrating a change in a jitter level according to an embodiment of the present disclosure.

FIG. 12 is a graph illustrating how there changes a jitter level, which is obtained while adjusting the number of frames to be used to measure a jitter, at an inspection frequency of 230 KHz being a harmonic of a display panel.

FIG. 12 shows jitter levels that are respectively measured when the number of frames to be driven increases to 10, 20, and 100.

It is observed that, when the number of frames to be driven is 10 or 20, the event where the jitter level exceeds 50 being a reference level occurs limitedly. However, in the case where the number of frames to be driven is 100, it is observed that sensing electrodes each having a jitter level exceeding the reference level of 50 appear clearly. For example, when the number of frames to be driven is 10 or 20, because jitter levels of sensing electrodes Rx4 and Rx5 are equal to or less than the reference level, it may be difficult to detect a defect of the display panel. In contrast, when the number of frames to be driven is 100, because the jitter levels of the sensing electrodes Rx4 and Rx5 are about 200 exceeding the reference level of 50, it may be possible to detect a defect of the display panel.

The inspection part 100 (refer to FIG. 8) according to an embodiment of the present disclosure may monitor a change in a jitter level while increasing the number of to-be-driven frames of the input sensor. In an embodiment of the present disclosure, the inspection part 100 may monitor a change in a jitter level while increasing the number of frames from 10 to 100, may detect sensing electrodes (e.g., Rx4, Rx5, Rx8, Rx9, Rx12, and Rx13) each having a jitter level exceeding the reference level, and may detect portions of the display panel, which overlap the detected sensing electrodes, as a defect.

According to an embodiment of the present disclosure, an apparatus and a method for inspecting a defect of a display panel may effectively detect the defect of the display panel, which reduces performance of an input sensor.

According to an embodiment of the present disclosure, an apparatus and a method for inspecting a defect of a display panel may determine a specific inspection frequency increasing a magnitude of a jitter of an input sensor and may detect the defect of the display panel based on a clear change of the jitter of the input sensor driven at the inspection frequency thus determined.

While the present disclosure has been described with reference to embodiments thereof, it will be apparent to those of ordinary skill in the art that various changes and modifications may be made therein without departing from the spirit and scope of the present disclosure as defined in the appended claims.

What is claimed is:

1. An apparatus for inspecting a defect of a display panel, comprising:

the display panel configured to display an image;

an input sensor disposed on the display panel and configured to sense an input applied from outside;

a sensor driving part configured to drive the input sensor; and an inspection part connected with the sensor driving part, and configured to set a frequency of the input sensor to an inspection frequency and to detect the defect of the display panel based on a change in a jitter occurring when the input sensor is driven at the inspection frequency, wherein the inspection frequency includes a harmonic frequency of a driving frequency of the display panel.

2. The apparatus of claim 1, wherein the display panel includes:

a base layer;

a circuit element layer disposed on the base layer;

a display element layer disposed on the circuit element layer; and an encapsulation layer disposed on the display element layer, wherein the display element layer includes:

a first electrode;

a second electrode disposed on the first electrode; and a light-emitting layer disposed between the first electrode and the second electrode.

3. The apparatus of claim 2, wherein the inspection part detects a deposition defect of the second electrode.

4. The apparatus of claim 1, wherein the inspection part includes:

a frequency setting part configured to set the frequency of the input sensor to the inspection frequency; and a defect detection part configured to determine the defect of the display panel when a level of the jitter is higher than a reference level.

5. The apparatus of claim 4, wherein the input sensor includes a plurality of sensing electrodes, and wherein the plurality of sensing electrodes include a plurality of transmit electrodes and a plurality of receive electrodes crossing each other.

6. The apparatus of claim 5, wherein the defect detection part is configured to:

extract specific sensing electrodes, at which the level of the jitter is higher than the reference level, from among the plurality of sensing electrodes; and determine specific portions of the display panel, which overlap the specific sensing electrodes thus extracted, as the defect.

7. The apparatus of claim 4, wherein the inspection part further includes:

a frequency selection part configured to select a frequency, which allows a magnitude of the change in the jitter of the input sensor to increase, as the inspection frequency and to store the selected frequency in the sensor driving part.

8. The apparatus of claim 7, wherein the frequency selection part is configured to:

select a value obtained by multiplying a number of scan lines of the display panel and a refresh rate of a screen together as the inspection frequency.

9. The apparatus of claim 7, wherein the frequency selection part is configured to:

drive the input sensor at a plurality of frequencies of a given range, with the display panel driven; and select frequencies, at which a change magnitude in the level of the jitter is equal to or greater than a specific reference, as the inspection frequency.

10. The apparatus of claim 7, wherein the frequency selection part is configured to:

calculate the inspection frequency from the driving frequency of the display panel through fast Fourier transform, with the display panel driven and the input sensor not driven.

11. The apparatus of claim 1, wherein the inspection part is configured to:

monitor the change in the jitter while increasing a number of frames to be driven in the input sensor.

12. A method for inspecting a defect of a display panel, comprising:

driving the display panel;

setting an inspection frequency of an input sensor disposed on the display panel;

driving the input sensor at the inspection frequency; and inspecting the defect of the display panel based on a change in a jitter occurring when the input sensor is driven, wherein the inspection frequency includes a harmonic frequency of a driving frequency of the display panel.

13. The method of claim 12, wherein the inspecting of the defect of the display panel includes:

detecting a deposition defect of a power electrode disposed between a light-emitting layer and an encapsulation layer included in the display panel.

14. The method of claim 12, wherein the inspecting of the defect of the display panel includes:

determining the defect of the display panel when a level of the jitter is higher than a reference level.

15. The method of claim 14, wherein the input sensor includes a plurality of sensing electrodes, and wherein the plurality of sensing electrodes include a plurality of transmit electrodes and a plurality of receive electrodes crossing each other.

16. The method of claim 15, wherein the determining of the defect includes:

extracting specific sensing electrodes, at which the level of the jitter is higher than the reference level, from among the plurality of sensing electrodes; and determining specific portions of the display panel, which overlap the specific sensing electrodes thus extracted, as the defect.

17. The method of claim 14, further includes:

selecting a frequency, which allows a magnitude of the change in the jitter of the input sensor to increase, as the inspection frequency, so as to be stored in a memory.

18. The method of claim 17, wherein the selecting of the inspection frequency includes:

selecting a value obtained by multiplying a number of scan lines of the display panel and a refresh rate of a screen as the inspection frequency.

19. The method of claim 17, wherein the selecting of the inspection frequency includes:

driving the input sensor at a plurality of frequencies of a given range, with the display panel driven; and selecting frequencies, at which a change magnitude of the level of the jitter is equal to or greater than a specific reference, from among the plurality of frequencies as the inspection frequency.

20. The method of claim 12, wherein the inspecting of the defect of the display panel includes:

monitoring the change in the jitter while increasing a number of frames to be driven in the input sensor.

* * * * *